(12) United States Patent
Murayama et al.

(10) Patent No.: US 11,390,560 B2
(45) Date of Patent: Jul. 19, 2022

(54) CHEMICALLY STRENGTHENED GLASS AND METHOD FOR MANUFACTURING CHEMICALLY STRENGTHENED GLASS

(71) Applicant: AGC INC., Chiyoda-ku (JP)

(72) Inventors: Suguru Murayama, Tokyo (JP); Yuriko Banno, Tokyo (JP)

(73) Assignee: AGC INC., Chiyoda-ku (JP)

( * ) Notice: Subject to any disclaimer, the term of this patent is extended or adjusted under 35 U.S.C. 154(b) by 551 days.

(21) Appl. No.: 16/032,566

(22) Filed: Jul. 11, 2018

(65) Prior Publication Data
US 2018/0319706 A1 Nov. 8, 2018

Related U.S. Application Data

(63) Continuation of application No. PCT/JP2017/001742, filed on Jan. 19, 2017.

(30) Foreign Application Priority Data

Jan. 21, 2016 (JP) .............. JP2016-010002
Oct. 18, 2016 (JP) .............. JP2016-204746
Oct. 18, 2016 (JP) .............. JP2016-204747

(51) Int. Cl.
*B32B 15/04* (2006.01)
*B32B 17/06* (2006.01)
(Continued)

(52) U.S. Cl.
CPC .......... *C03C 21/002* (2013.01); *C03C 3/083* (2013.01); *C03C 3/085* (2013.01); *C03C 3/087* (2013.01);
(Continued)

(58) Field of Classification Search
CPC .................................................. C03C 21/002
(Continued)

(56) References Cited

U.S. PATENT DOCUMENTS 3,433,611 A * 3/1969 Kubichan .............. C03C 3/097
65/30.14
4,156,755 A 5/1979 Rinehart
(Continued)

FOREIGN PATENT DOCUMENTS

JP 60-180936 9/1985
JP 2000-516903 12/2000
(Continued)

OTHER PUBLICATIONS

International Search Report dated Mar. 21, 2017 in PCT/JP2017/001742 filed Jan. 19, 2017 (with English Translation).
(Continued)

*Primary Examiner* — Lauren R Colgan
(74) *Attorney, Agent, or Firm* — Oblon, McClelland, Maier & Neustadt, L.L.P.

(57) ABSTRACT

A chemically strengthened glass having a thickness t of 2 mm or less, having a compressive stress value ($CS_{90}$) at a portion of 90 μm deep from a glass surface being 25 MPa or more, and satisfying a number of fragments generated within a size of 25 mm×25 mm being 20 or less in a fracture test according to an indenter indentation test under a condition of holding a load ranging from 5 kgf to 10 kgf for 15 seconds with a pyramidal diamond indenter having an indenter angle of a facing angle of 60°.

20 Claims, 7 Drawing Sheets

(51) Int. Cl.
  *C03C 21/00* (2006.01)
  *C03C 3/087* (2006.01)
  *C03C 3/097* (2006.01)
  *C03C 3/085* (2006.01)
  *C03C 3/091* (2006.01)
  *C03C 3/083* (2006.01)
  *C03C 3/093* (2006.01)

(52) U.S. Cl.
  CPC .............. *C03C 3/091* (2013.01); *C03C 3/093* (2013.01); *C03C 3/097* (2013.01); *C03C 21/00* (2013.01)

(58) Field of Classification Search
  USPC .................. 428/426, 428, 432, 434, 410
  See application file for complete search history.

(56) References Cited

U.S. PATENT DOCUMENTS

| | | | |
|---|---|---|---|
| 5,674,790 A | 10/1997 | Araujo | |
| 6,333,285 B1 | 12/2001 | Chopinet et al. | |
| 6,518,211 B1 | 2/2003 | Bradshaw et al. | |
| 8,075,999 B2 | 12/2011 | Barefoot et al. | |
| 9,139,469 B2 | 9/2015 | Comte et al. | |
| 10,131,567 B2* | 11/2018 | Beall ................. | B32B 17/06 |
| 2001/0049327 A1 | 12/2001 | Hachitani | |
| 2003/0109370 A1 | 6/2003 | Ikenishi et al. | |
| 2004/0180239 A1 | 9/2004 | Ikenishi et al. | |
| 2005/0090377 A1 | 4/2005 | Shelestak et al. | |
| 2006/0063009 A1 | 3/2006 | Naitou et al. | |
| 2006/0205584 A1 | 9/2006 | Ikenishi et al. | |
| 2007/0060465 A1 | 3/2007 | Varshneya et al. | |
| 2008/0020919 A1 | 1/2008 | Murata | |
| 2009/0220824 A1 | 9/2009 | Ikenishi et al. | |
| 2009/0263662 A1 | 10/2009 | Shelestak et al. | |
| 2010/0028607 A1* | 2/2010 | Lee ................... | C03C 21/005 |
| | | | 428/156 |
| 2010/0160141 A1 | 6/2010 | Ikenishi et al. | |
| 2010/0167091 A1 | 7/2010 | Tachiwana et al. | |
| 2010/0233407 A1 | 9/2010 | Shelestak et al. | |
| 2011/0079048 A1 | 4/2011 | Shelestak et al. | |
| 2011/0274916 A1 | 11/2011 | Murata | |
| 2011/0294649 A1 | 12/2011 | Gomez et al. | |
| 2011/0312483 A1 | 12/2011 | Nakashima et al. | |
| 2012/0021892 A1 | 1/2012 | Tachiwana et al. | |
| 2012/0052271 A1* | 3/2012 | Gomez ................. | C03C 3/091 |
| | | | 428/213 |
| 2012/0264585 A1* | 10/2012 | Ohara .................. | C03C 3/087 |
| | | | 501/70 |
| 2012/0321898 A1 | 12/2012 | Meinhardt et al. | |
| 2012/0328907 A1 | 12/2012 | Tachiwana et al. | |
| 2013/0040169 A1 | 2/2013 | Ikenishi et al. | |
| 2013/0183512 A1 | 7/2013 | Gy et al. | |
| 2013/0186140 A1* | 7/2013 | Brix .................. | C03B 18/02 |
| | | | 65/30.14 |
| 2013/0189486 A1 | 7/2013 | Wang et al. | |
| 2014/0023865 A1 | 1/2014 | Comte et al. | |
| 2014/0230492 A1 | 8/2014 | Murata | |
| 2014/0302346 A1 | 10/2014 | Tachiwana et al. | |
| 2014/0356576 A1 | 12/2014 | Dejneka et al. | |
| 2014/0364298 A1 | 12/2014 | Ohara et al. | |
| 2015/0030834 A1* | 1/2015 | Morey ................. | G01N 3/30 |
| | | | 428/220 |
| 2015/0030840 A1 | 1/2015 | Gomez et al. | |
| 2015/0239775 A1* | 8/2015 | Amin .................. | C03C 3/091 |
| | | | 428/220 |
| 2015/0259244 A1 | 9/2015 | Amin et al. | |
| 2015/0344351 A1 | 12/2015 | Comte et al. | |
| 2015/0368148 A1* | 12/2015 | Duffy ................. | C03C 3/095 |
| | | | 428/220 |
| 2016/0122240 A1* | 5/2016 | Oram ................. | C03C 21/002 |
| | | | 428/220 |
| 2016/0347655 A1 | 12/2016 | Meinhardt et al. | |
| 2017/0174557 A1* | 6/2017 | Gross ................. | H05K 5/0017 |
| 2017/0295657 A1 | 10/2017 | Gross et al. | |
| 2017/0305786 A1* | 10/2017 | Roussev ............. | C03C 21/002 |
| 2017/0355640 A1* | 12/2017 | Oram ................. | C03C 21/002 |
| 2018/0022638 A1 | 1/2018 | Comte et al. | |
| 2018/0186685 A1* | 7/2018 | Murayama .......... | C03C 21/002 |
| 2018/0319706 A1* | 11/2018 | Murayama .......... | C03C 21/002 |
| 2019/0225537 A1* | 7/2019 | Kashima ............. | C03C 3/095 |

FOREIGN PATENT DOCUMENTS

| | | |
|---|---|---|
| JP | 2001-302278 | 10/2001 |
| JP | 2002-507538 | 3/2002 |
| JP | 2002-174810 | 6/2002 |
| JP | 2002-358626 A | 12/2002 |
| JP | 2004-131314 A | 4/2004 |
| JP | 2006-083045 | 3/2006 |
| JP | 2007-527354 | 9/2007 |
| JP | 2008-1590 A | 1/2008 |
| JP | 2010-116276 A | 5/2010 |
| JP | 2010-168233 A | 8/2010 |
| JP | 2010-202514 A | 9/2010 |
| JP | 2011-136895 | 7/2011 |
| JP | 2012-20921 A | 2/2012 |
| JP | 2012-232882 | 11/2012 |
| JP | 2013-520385 | 6/2013 |
| JP | 2013-520387 A | 6/2013 |
| JP | 2013-520388 | 6/2013 |
| JP | 2013-527115 | 6/2013 |
| JP | 2013-536155 | 9/2013 |
| JP | 2013-542159 | 11/2013 |
| JP | WO 2015/127483 A2 | 8/2015 |
| JP | 2015-527970 | 9/2015 |
| JP | 2016-028000 | 2/2016 |
| JP | 2016-044119 | 4/2016 |
| WO | WO 2007/142324 A1 | 12/2007 |
| WO | WO 2011/149740 A1 | 12/2011 |
| WO | WO 2017/126607 A1 | 7/2017 |

OTHER PUBLICATIONS

Written Opinion dated Mar. 21, 2017 in PCT/JP2017/001742 filed Jan. 19, 2017.
International Search Report dated Apr. 25, 2017 in PCT/JP2017/001755 filed Jan. 19, 2017 (with English Translation).
Written Opinion dated Apr. 25, 2017 in PCT/JP2017/001755 filed Jan. 19, 2017.
A. J. Burffraaf, "The strengthening of glass by ion exchange. Part 2. Stress formation and stress relaxation after ion exchange in alkali aluminosilicate glasses in connection with structural changes in the glass," Physics and Chemistry of Glasses, Society of Glass Technology, vol. 7, No. 5, Oct. 1966, pp. 169-172.
Akio Makishima, et al., "Glass Materials Design System: VitrES," Fujitsu, vol. 44, No. 6, Nov. 1993, pp. 560-565 (with English Abstract).
I. W. Donald, "Methods for improving the mechanical properties of oxide glasses," Journal of Materials Science, vol. 24, No. 12, 1989, pp. 4177-4208.
Malcolm D. Ingram, et al., "Origins of anomalous mixed-alkali effects in ion-exchange glasses," Glass and Science Technology, vol. 73, No. 4, , 2000, pp. 89-104.
H. M. Garfinkel, et al., "Ion Concentration and Stress in a Chemically Tempered Glass," Journal of the American Ceramic Society, vol. 53, No. 12, Dec. 1970, pp. 686-691.
U.S. Appl. No. 62/320,109; Schneider et al. filed Apr. 6, 2016.
Roussev et al., U.S. Appl. No. 62/325,353, filed Apr. 20, 2016.

* cited by examiner

[Fig. 1]
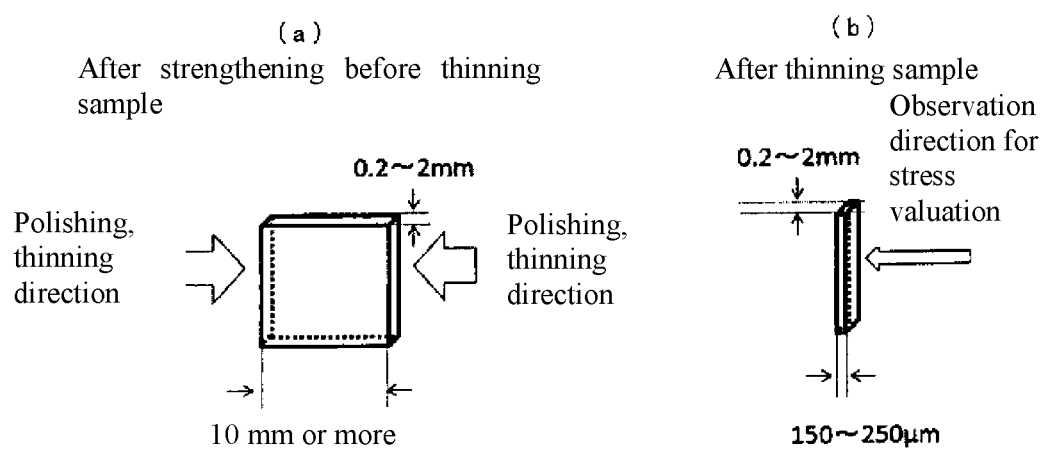
[FIG. 2]
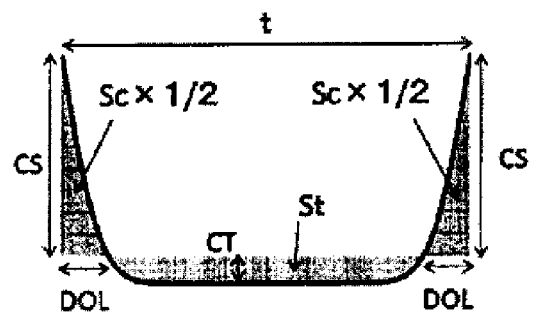

[FIG 3]
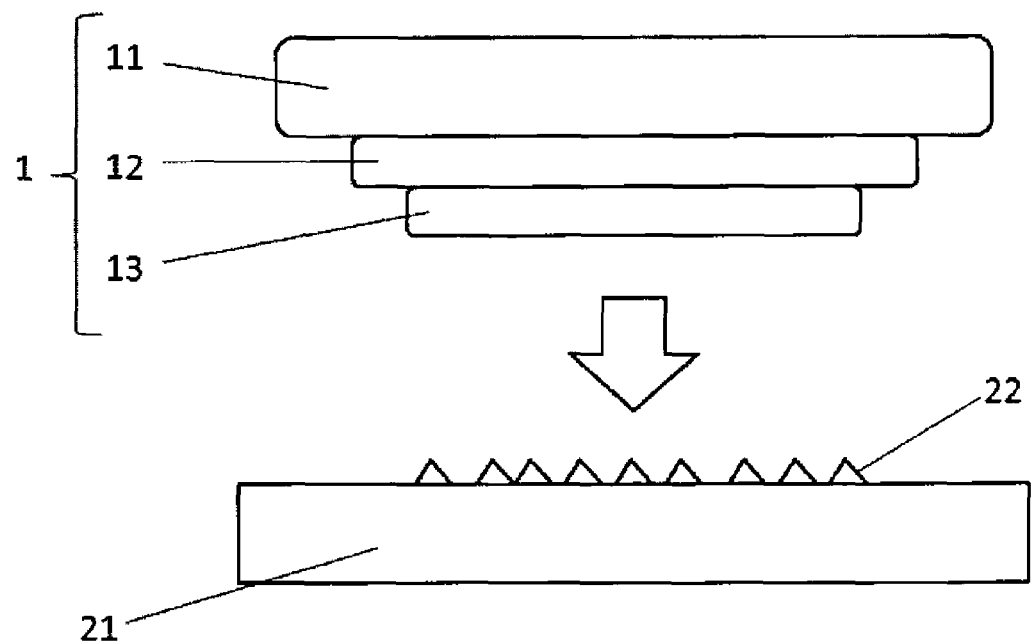
[FIG 4]
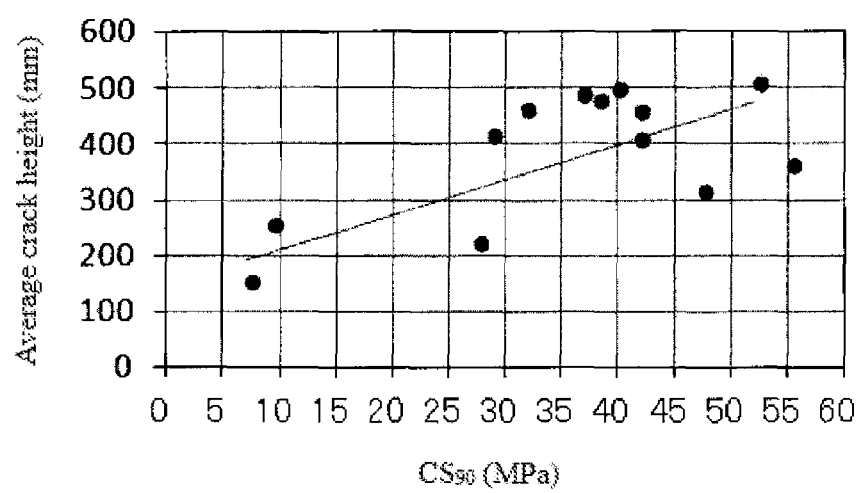

[FIG. 5]
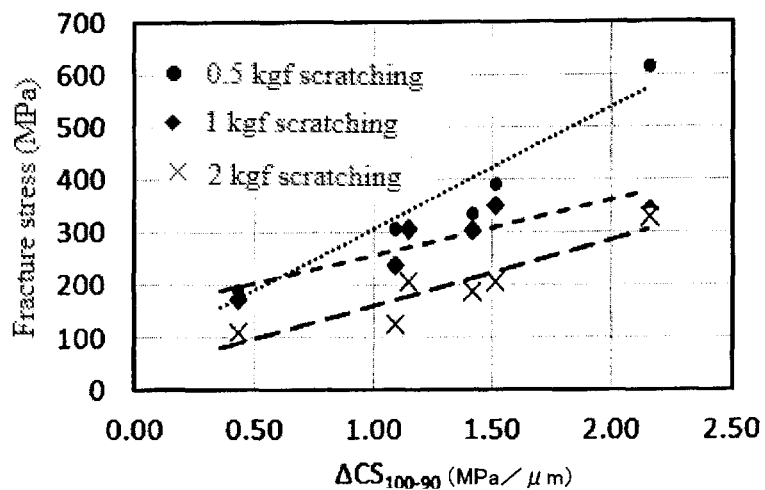
[FIG. 6]
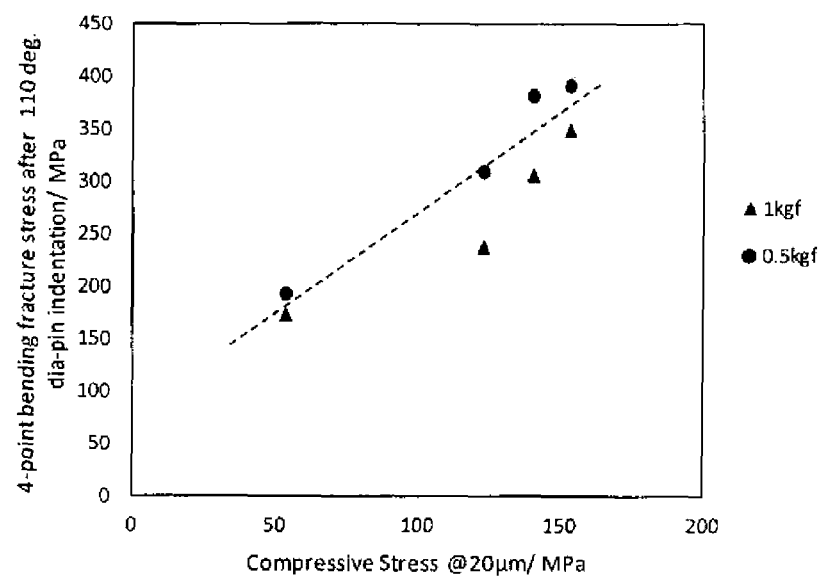

[FIG. 7]
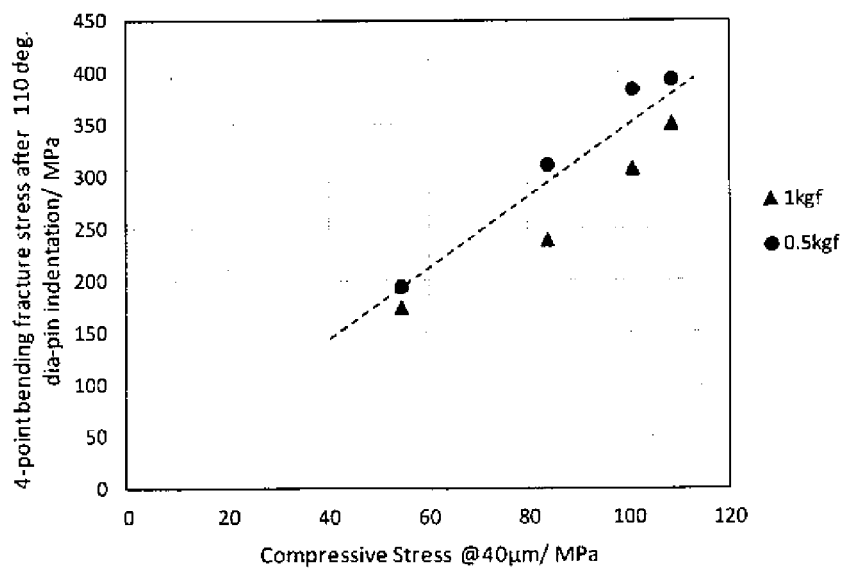
[FIG. 8]
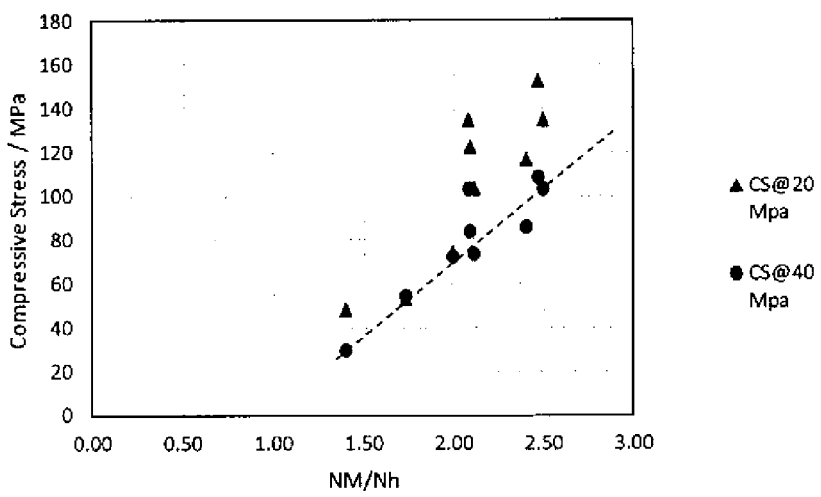

[FIG. 9]
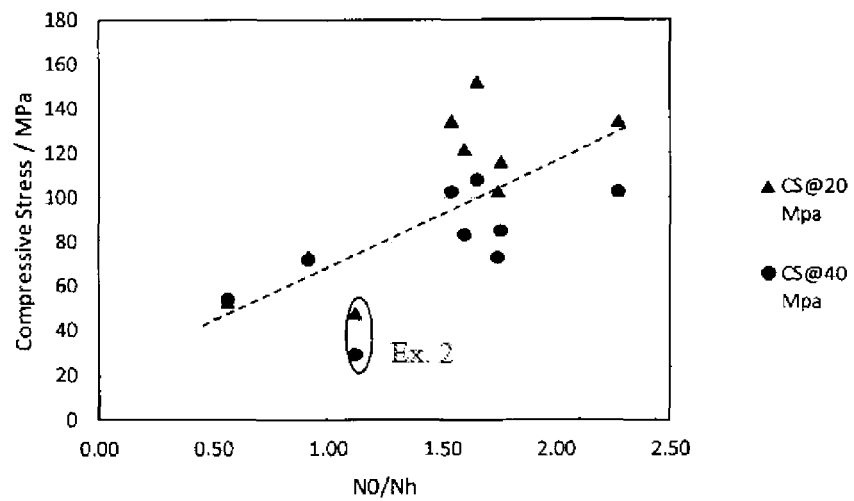
[FIG. 10]
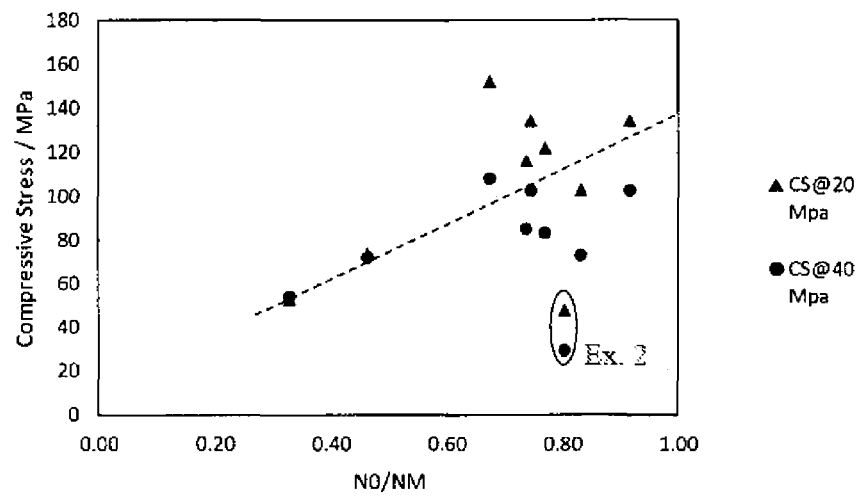

[FIG. 11]
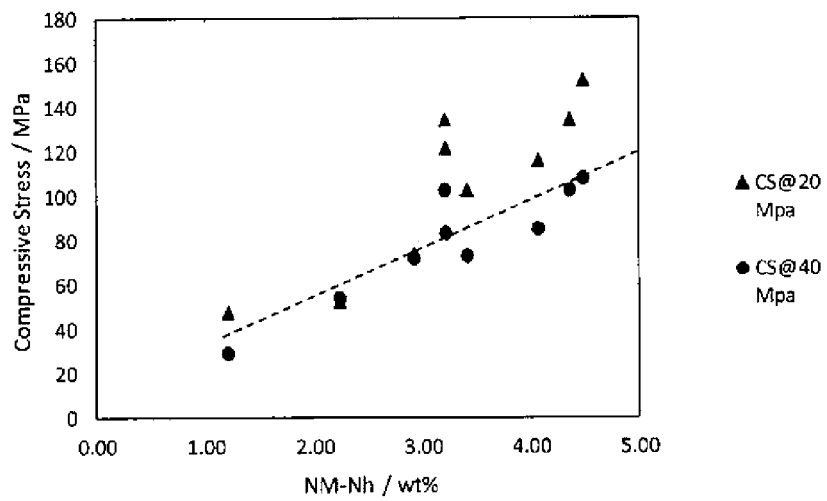
[FIG. 12]
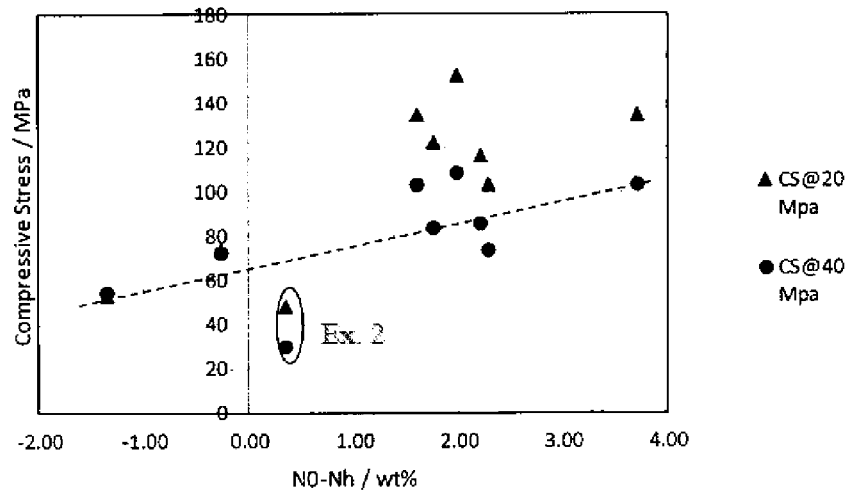

[FIG. 13]
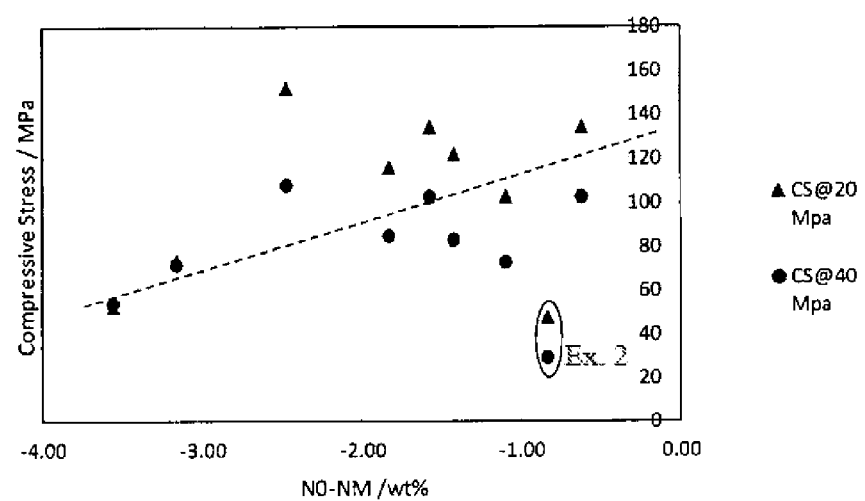

CHEMICALLY STRENGTHENED GLASS AND METHOD FOR MANUFACTURING CHEMICALLY STRENGTHENED GLASS

TECHNICAL FIELD

The present invention relates to a chemically strengthened glass and a method for manufacturing a chemically strengthened glass.

BACKGROUND ART

In recent years, in order to enhance protection and good appearance of display devices of mobile devices such as mobile phones, smart phones, personal digital assistant (PDA), and tablet terminals, a cover glass composed of a chemically strengthened glass has been used.

In particular, in the mobile devices such as smart phones, generation of a deep flaw when they are dropped by mistake and collide with a collision object having a small-angle colliding part (hereinafter also referred to as an acute-angle object) such as sand, and development of a flaw due to a generation of tensile stress on the glass surface in the flawed state are prone to occur. Thus, there are relatively many opportunities where breakage of the chemically strengthened glass as a cover glass occurs. Accordingly, a chemically strengthened glass which is hardly broken even in the case of collision with an acute-angle object (hereinafter also referred to as "having a high acute-angle flaw strength") is desired.

It is considered that, as the glass having a high acute-angle flaw strength, a chemically strengthened glass having a deep compressive stress layer (DOL) is advantageous, and in order to enhance production efficiency, a glass showing a large ion exchange rate has been desired.

Patent Document 1 discloses that a chemically strengthened glass having a large depth of the compressive stress layer (DOL) has a high fracture resistance in a drop test using #180 sandpaper.

Patent Document 2 discloses a lithium aluminosilicate glass showing a fast ion exchange rate.

Furthermore, Patent Document 1 discloses a chemically strengthened glass that uses both of Na—K exchange where Na ions in the glass are exchanged with K ions and Li—Na exchange where Li ions in the glass are exchanged with Na ions.

PRIOR ART DOCUMENT

Patent Document

Patent Document 1: US-A-2015/0259244
Patent Document 2: JP-T-2013-520385
(the term "JP-T" as used herein means a published Japanese translation of a PCT patent application)

SUMMARY OF THE INVENTION

Problems that the Invention is to Solve

However, the present inventors have extensively studied, and it was found that, when a mobile device such as a smart phone is dropped by mistake at a practical scene such as on the street, the depth of the flaw generated on the cover glass by the collision with an acute-angle object such as sand is deeper than the flaw generated in a drop test using #180 sandpaper. Therefore, in the cover glass composed of a chemically strengthened glass, at a practical scene, the resistance against fracture caused by the flaw generated in the drop test using #180 sandpaper as described in Patent Document 1 is not necessarily sufficient. Moreover, in the chemically strengthened glass that uses the Na—K exchange as described in Patent Document 1, it requires a long ion exchange treatment time such as 10 hours or more to obtain a large depth of the compressive stress layer, such as more than 100 μm.

Though Patent Document 2 discloses a lithium aluminosilicate glass showing a fast ion exchange rate, a guideline for enhancing strength against the acute-angle object flaw is unclear.

As above, specific methods for enhancing the acute-angle object flaw strength has hitherto not been clear. For satisfying a high acute-angle object flaw strength, a glass having a deeper depth of the compressive stress layer and a larger compressive stress value of the compressive stress layer is necessary. Moreover, it is simultaneously required that in the case of breakage, the number of the glass fragmentation is small and a safety is high. In order to obtain such a glass, a glass showing a large ion exchange rate necessary for chemical strengthening is desired.

Accordingly, an object of the present invention is to provide a chemically strengthened glass which is excellent in the acute-angle object flaw strength and also has a high safety at fragmentation and shows a fast ion exchange rate.

It is known that the cover glass is broken by a cause of surface tensile stress generated at the time of drop or by the collision with an object, and also is broken due to a flaw resulting from the collision of the surface with an acute-angle object, and the like. In order to improve strength, it is necessary to enhance both of bending strength and bending strength after flawing with an acute-angle object (hereinafter also referred to as "bending strength after flawing"). Here, in order to enhance both of the bending strength and the bending strength after flawing, the following four items are required: (1) introduction of larger compressive stress as far as possible to the outermost surface of the glass, (2) introduction of deeper compressive stress layer as far as possible to the glass, (3) introduction of larger compressive stress as far as possible to the inside of the glass as deep as possible, and, in order to achieve (2) and (3), (4) a large ion exchange rate.

Here, in Patent Document 1, though the above (1), (2), and (4) are achieved by using both of the Na—K exchange and the Li—Na exchange, it is insufficient in view of the above (3).

In consideration of the above conventional problems, an object of the present invention is to provide a chemically strengthened glass having both of a high bending strength and a high bending strength after flawing and a method for manufacturing the chemically strengthened glass.

Means for Solving the Problems

One embodiment of the present invention relates to a chemically strengthened glass having a thickness t of 2 mm or less, having a compressive stress value ($CS_{90}$) at a portion of 90 μm deep from a glass surface being 25 MPa or more, and satisfying a number of fragments generated within a size of 25 mm×25 mm being 20 or less in a fracture test according to an indenter indentation test under a condition of holding a load ranging from 5 kgf to 10 kgf for 15 seconds with a pyramidal diamond indenter having an indenter angle of a facing angle of 60°, in which the chemically strengthened glass provides a depth of a compressive stress layer (DOL) being 50 µm or more when a glass sheet having a thickness of 1 mm which has a matrix composition of the chemically strengthened glass and has been gradually cooled from a temperature T° C., which is 30° C. to 50° C. higher than a glass transition temperature, to (T−300)° C. at 0.5° C./minute, is subjected to an ion exchange treatment for one hour with a molten salt at 400° C. composed of $KNO_3$, $NaNO_3$, or a mixed salt of $KNO_3$ and $NaNO_3$.

Moreover, it also relates to a chemically strengthened glass having a thickness t of 2 mm or less, having a compressive stress value ($CS_{90}$) at a portion of 90 µm deep from a glass surface being 25 MPa or more, and satisfying a number of fragments generated within a size of 25 mm×25 mm being 20 or less in a fracture test according to an indenter indentation test under a condition of holding a load ranging from 5 kgf to 10 kgf for 15 seconds with a pyramidal diamond indenter having an indenter angle of a facing angle of 60°, in which the chemically strengthened glass provides a depth of a compressive stress layer (DOL) being 70 µm or more when a glass sheet having a thickness of 1 mm which has a matrix composition of the chemically strengthened glass and has been gradually cooled from a temperature T° C., which is 30° C. to 50° C. higher than a glass transition temperature, to (T−300°) C at 0.5° C./minute, is subjected to an ion exchange treatment for one hour with a molten salt at 425° C. composed of $KNO_3$, $NaNO_3$, or a mixed salt of $KNO_3$ and $NaNO_3$.

In the above chemically strengthened glass, any of bending strength after flaw σa, σb, and σc is preferably 150 MPa or more. Each of the bending strength after flaw σa, σb, and σc is a fracture stress value (bending strength, unit: MPa) obtained by performing four-point bending test under conditions of an under spun of 30 mm, an upper spun of 10 mm, and a crosshead speed of 0.5 mm/minute after the glass surface is flawed after a diamond indenter (indenter angle of facing angle: 110°) is pressed thereto for 15 seconds at a load of 0.5 kgf, 1 kgf, and 2 kgf, respectively. The degree of tensile stress generated on the cover glass surface at the time of drop of a smart phone is about 150 MPa. Then, in the case where any of σa, σb, and σc is 150 MPa or more, fracture resulting from the stress generated by the drop even after the occurrence of the flaw with an acute-angle object can be prevented.

In the above chemically strengthened glass, $\Delta CS_{100-90}$ (unit: MPa/µm) is preferably 0.4 or more, in which $\Delta CS_{100-90}$ is calculated according to the following expression using $CS_{90}$ and a compressive stress value ($CS_{100}$) at a portion of 100 µm deep from the glass surface.

$$\Delta CS_{100-90} = (CS_{90} - CS_{100})/(100-90)$$

$\Delta CS_{100-90}$ (unit: MPa/µm) is preferably 4.0 or less.

In the above chemically strengthened glass, $\Delta CS_{DOL-20}$ (unit: MPa/µm) is preferably 0.4 or more, in which $\Delta CS_{DOL-20}$ is calculated according to the following expression using a compressive stress value $CS_{DOL-20}$ at a depth closer to a glass surface side by 20 µm from DOL.

$$\Delta CS_{DOL-20} = CS_{DOL-20}/20$$

$\Delta CS_{DOL-20}$ is preferably 4.0 or less.

In the above chemically strengthened glass, a surface compressive stress value (CS) is preferably 300 MPa or more.

In the above chemically strengthened glass, the depth of a compressive stress layer (DOL) is preferably 100 µm or more.

In the above chemically strengthened glass, the thickness t is preferably 0.9 mm or less.

In the above chemically strengthened glass, an area Sc (MPa·µm) of a compressive stress layer is preferably 20,000 MPa·µm or more.

In the above chemically strengthened glass, a value Sc/t (MPa) obtained by dividing an area Sc (MPa·µm) of the compressive stress layer by the thickness t (m) is preferably 28 MPa or more.

In the above chemically strengthened glass, the matrix composition of the chemically strengthened glass preferably contains, in terms of molar percentage on the basis of oxides, from 50 to 80% of $SiO_2$, from 1 to 30% of $Al_2O_3$, from 0 to 6% of $B_2O_3$, from 0 to 6% of $P_2O_5$, from 0 to 20% of $Li_2O$, from 0 to 20% of $Na_2O$, from 0 to 10% of $K_2O$, from 0 to 20% of MgO, from 0 to 20% of CaO, from 0 to 20% of SrO, from 0 to 15% of BaO, from 0 to 10% of ZnO, from 0 to 5% of $TiO_2$, and from 0 to 8% of $ZrO_2$.

In the matrix composition of the above chemically strengthened glass, the content of $ZrO_2$ in terms of molar percentage on the basis of oxides is preferably 1.2% or less.

The content of $Na_2O$ in terms of molar percentage on the basis of oxides is preferably 3% or more.

The content of $K_2O$ in terms of molar percentage on the basis of oxides is preferably 0.5% or more.

The content of $B_2O_3$ in terms of molar percentage on the basis of oxides is preferably 1% or less.

The content of $Al_2O_3$ in terms of molar percentage on the basis of oxides is preferably 11% or less.

Moreover, another embodiment of the present invention relates to a chemically strengthened glass which satisfies the following expressions (1) and (2), $$NM/Nh \geq 1.8 \quad (1),$$

$$KM/Kh \geq 3 \quad (2),$$

in which NM, Nh, KM, and Kh each represents the following:

NM: a value obtained by converting a maximum value in an Na ion concentration profile in a sheet thickness direction of the chemically strengthened glass measured by EPMA to $Na_2O$ (% by weight);

Nh: a value obtained by converting a central value of a sheet thickness in the Na ion concentration profile in the sheet thickness direction of the chemically strengthened glass measured by EPMA to $Na_2O$ (% by weight);

KM: a value obtained by converting a maximum value in a K ion concentration profile in the sheet thickness direction of the chemically strengthened glass measured by EPMA to $K_2O$ (% by weight); and Kh: a value obtained by converting a central value of a sheet thickness in the K ion concentration profile in the sheet thickness direction of the chemically strengthened glass measured by EPMA to $K_2O$ (% by weight).

The above chemically strengthened glass preferably further satisfies the following expression (3), $$N0/Nh \geq 0.8 \quad (3),$$

in which N0 represents the following:

N0: a value obtained by converting a value on an outermost surface in the Na ion concentration profile in the sheet thickness direction of the chemically strengthened glass measured by EPMA to $Na_2O$ (% by weight).

The above chemically strengthened glass preferably further satisfies the following expression (4), $$N0/NM \geq 0.4 \quad (4),$$

in which N0 represents the following:

N0: a value obtained by converting a value on an outermost surface in the Na ion concentration profile in the sheet thickness direction of the chemically strengthened glass measured by EPMA to $Na_2O$ (% by weight).

Furthermore, still another one embodiment of the present invention relates to a chemically strengthened glass which satisfies the following expressions (5) and (6), $$NM-Nh \geq 2.2 \text{ (wt \%)} \quad (5),$$

$$KM-Kh \geq 3 \text{ (wt \%)} \quad (6),$$

in which NM, Nh, KM, and Kh each represents the following:

NM: a value obtained by converting a maximum value in an Na ion concentration profile in a sheet thickness direction of the chemically strengthened glass measured by EPMA to $Na_2O$ (% by weight);

Nh: a value obtained by converting a central value of a sheet thickness in the Na ion concentration profile in the sheet thickness direction of the chemically strengthened glass measured by EPMA to $Na_2O$ (% by weight);

KM: a value obtained by converting a maximum value in a K ion concentration profile in the sheet thickness direction of the chemically strengthened glass measured by EPMA to $K_2O$ (% by weight); and Kh: a value obtained by converting a central value of a sheet thickness in the K ion concentration profile in the sheet thickness direction of the chemically strengthened glass measured by EPMA to $K_2O$ (% by weight).

The above chemically strengthened glass preferably further satisfies the following expression (7), $$N0-Nh \geq -0.4 \text{ (wt \%)} \quad (7),$$

in which N0 represents the following:

N0: a value obtained by converting a value on an outermost surface in the Na ion concentration profile in the sheet thickness direction of the chemically strengthened glass measured by EPMA to $Na_2O$ (% by weight).

The above chemically strengthened glass preferably further satisfies the following expression (8), $$N0-NM \geq -3.5 \text{ (wt \%)} \quad (8),$$

in which N0 represents the following:

N0: a value obtained by converting a value on an outermost surface in the Na ion concentration profile in the sheet thickness direction of the chemically strengthened glass measured by EPMA to $Na_2O$ (% by weight).

In the above chemically strengthened glass, a compressive stress value ($CS_{20}$) at a portion of 20 μm deep from the glass surface is preferably 60 MPa or more.

In the above chemically strengthened glass, a compressive stress value ($CS_{40}$) at a portion of 40 μm deep from the glass surface is preferably 60 MPa or more.

In the above chemically strengthened glass, a bending strength is preferably 400 MPa or more.

In the above chemically strengthened glass, a surface compressive stress value (CS) is preferably 400 MPa or more.

In the above chemically strengthened glass, a depth of a compressive stress layer (DOL) is preferably 100 μm or more.

The above chemically strengthened glass is preferably a sheet-form with a thickness t of 2 mm or less.

In the above chemically strengthened glass, a number of fragments generated within a size of 25 mm×25 mm is preferably 20 or less in a fracture test according to an indenter indentation test under a condition of holding a load ranging from 5 kgf to 10 kgf for 15 seconds with a pyramidal diamond indenter in which a facing angle is 60°.

In the above chemically strengthened glass, a matrix composition of the chemically strengthened glass preferably contains, in terms of molar percentage on the basis of oxides, from 50 to 80% of $SiO_2$, from 1 to 30% of $Al_2O_3$, from 0 to 5% of $B_2O_3$, from 0 to 4% of $P_2O_5$, from 3 to 20% of $Li_2O$, from 0 to 8% of $Na_2O$, from 0 to 10% of $K_2O$, from 3 to 20% of MgO, from 0 to 20% of CaO, from 0 to 20% of SrO, from 0 to 15% of BaO, from 0 to 10% of ZnO, from 0 to 1% of $TiO_2$, and from 0 to 8% of $ZrO_2$.

In the matrix composition of the above chemically strengthened glass, the content of $ZrO_2$ in terms of molar percentage on the basis of oxides is preferably 1.2% or less.

The content of $Na_2O$ in terms of molar percentage on the basis of oxides is preferably 3% or more.

The content of $K_2O$ in terms of molar percentage on the basis of oxides is preferably 0.5% or more.

The content of $B_2O_3$ in terms of molar percentage on the basis of oxides is preferably 1% or less.

The content of $Al_2O_3$ in terms of molar percentage on the basis of oxides is preferably 11% or less.

Moreover, the present invention also relates to a method for manufacturing the above chemically strengthened glass including performing at least two stages of ion exchange treatments on a glass, in which $KNO_3$ concentration in a molten salt to be used in a first-stage ion exchange treatment is 60% by weight or more and $NaNO_3$ concentration in a molten salt to be used in a second-stage ion exchange treatment is 5% by weight or more.

Advantageous Effect of the Invention

An embodiment of the chemically strengthened glass of the present invention is excellent in acute-angle object flaw strength and also has a high safety at fragmentation and shows a short ion-exchange time.

An embodiment of the chemically strengthened glass of the present invention also has a high bending strength and a high bending strength after flawing.

BRIEF DESCRIPTION OF DRAWINGS

FIG. 1 is an outline view illustrating a manner for manufacturing a sample for measuring surface compressive stress (CS) of a chemically strengthened glass, and (a) shows a sample before polishing and (b) shows a thinned sample after polishing.

FIG. 2 is a conceptual view illustrating a stress profile of a chemically strengthened glass for explaining CS (surface compressive stress value), DOL (depth of surface compressive stress layer), CT (internal tensile stress), and St (area of internal tensile stress layer).

FIG. 3 shows a schematic view illustrating a test method for an on-sand drop test.

FIG. 4 is a graph plotting a relationship between a compressive stress value $CS_{90}$ (unit: MPa) at a portion of 90 μm deep from the grass surface and an average crack height (unit: mm) for the chemically strengthened glass of each example.

FIG. 5 is a graph plotting a relationship between $\Delta CS_{100-90}$ (unit: MPa/μm) and fracture stress (MPa) under each flawing condition for the chemically strengthened glass of each of Examples 4, 6, 8 to 10, and 15.

FIG. 6 shows a graph plotting a relationship between bending strength after flawing under a condition of a load of 0.5 kgf or 1 kgf and $CS_{20}$.

FIG. 7 shows a plot of a relationship between bending strength after flawing under a condition of a load of 0.5 kgf or 1 kgf and $CS_{40}$.

FIG. 8 shows a graph plotting a relationship between NM/Nh and $CS_{20}$ or $CS_{40}$.

FIG. 9 shows a graph plotting a relationship between N0/Nh and $CS_{20}$ or $CS_{40}$.

FIG. 10 shows a graph plotting a relationship between N0/NM and $CS_{20}$ or $CS_{40}$.

FIG. 11 shows a graph plotting a relationship between NM−Nh (unit: wt %) and $CS_{20}$ or $CS_{40}$.

FIG. 12 shows a graph plotting a relationship between N0−Nh and $CS_{20}$ or $CS_{40}$.

FIG. 13 shows a graph plotting a relationship between N0−NM and $CS_{20}$ or $CS_{40}$.

MODE FOR CARRYING OUT THE INVENTION

The following will describe the chemically strengthened glass of the present invention in detail.

The chemically strengthened glass of the present invention is a chemically strengthened glass I to be described in the following or a chemically strengthened glass II to be mentioned below.

In the chemically strengthened glass I of the present invention, a compressive stress value ($CS_{90}$) at a portion of 90 μm deep from the glass surface is 25 MPa or more and the number of fragments generated within a size of 25 mm×25 mm is 20 or less in a fracture test according to an indenter indentation test under the condition of holding a load ranging from 5 kgf to 10 kgf for 15 seconds with a pyramidal diamond indenter in which an indenter angle of the facing angle is 60°.

The chemically strengthened glass I of the present invention has a compressive stress layer formed by a chemical strengthening treatment (ion exchange treatment), on the surface. In the chemical strengthening treatment, the surface of a glass was ion-exchanged to form a surface layer where compressive stress remains. Specifically, by ion exchange at a temperature equal to or lower than the glass transition temperature, alkali metal ions being present in the vicinity of surface of the glass sheet and having a small ionic radius (typically Li ions or Na ions) are substituted with alkali ions having a larger ionic radius (typically Na ions or K ions for Li ions and K ions for Na ions). Thereby, compressive stress remains at the glass surface and the strength of the glass is improved.

In the chemically strengthened glass I of the present invention, the surface compressive stress value (CS) is preferably 300 MPa or more. In the case where CS of the chemically strengthened glass is 300 MPa or more, the glass has a good strength as a cover glass for a smart phone and a tablet, so that the case is preferred. The bending strength of such a glass is 350 MPa or more.

When a smart phone or a tablet PC is dropped, a large tensile stress is generated on the back surface of the cover glass by the collision with an obtuse-angle object or a rounded protruding object, and the degree thereof reaches about 350 MPa. At this time, in the case where CS is 300 MPa or more, the cover glass can endure a tensile stress of about 350 MPa, so that the case is preferred. CS of the chemically strengthened glass is more preferably 350 MPa or more, further preferably 400 MPa or more, and still further preferably 450 MPa or more.

On the other hand, an upper limit of CS of the chemically strengthened glass I is not particularly limited but, from the viewpoint of safety at fracture, it is, for example, 2,000 MPa or less, preferably 1,500 MPa or less, more preferably 1,000 MPa or less, and further preferably 800 MPa or less.

CS of the chemically strengthened glass can be appropriately adjusted by adjusting the chemical strengthening conditions, the glass composition, and the like.

CS of the chemically strengthened glass I of the present invention is defined as follows based on the values $CS_F$ and $CS_A$ resulting from the two kinds of measurement methods below. The same shall be applied to the compressive stress value ($CS_x$) at a portion of x μm deep from the glass surface.

$$CS = CS_F = 1.28 \times CS_A$$

Here, $CS_F$ is a value measured by means of a surface stress meter FSM-6000 manufactured by Orihara Manufacturing Co., Ltd. and determined by a program FsmV attached to the surface stress meter.

$CS_A$ is a value measured by the following procedure using a birefringence imaging system Abrio-IM manufactured by Tokyo Instruments, Inc. As shown in FIG. 1, a cross-section of a chemically strengthened glass having a size of 10 mm×10 mm or more and a thickness of about 0.2 to 2 mm is polished into a range of 150 to 250 μm to perform thinning. As a polishing procedure, grinding is performed to an objective thickness plus 50 μm or so by means of a #1000 diamond-electroplated grinding wheel, subsequently grinding is performed to an objective thickness plus 10 μm or so by means of a #2000 diamond-electroplated grinding wheel, and finally mirror-finishing with cerium oxide is performed to obtain the objective thickness. For the thus formed sample thinned to about 200 μm, using a monochromatic light of &=546 nm as a light source, measurement of phase difference (retardation) of the chemically strengthened glass is performed with a transmitted light by means of the birefringence imaging system, and stress is calculated by using the obtained value and the following expression (9):

$$F = \delta/(C \times t') \qquad \text{expression (9)}$$

In the expression (9), F represents stress (MPa), δ represents phase difference (retardation) (nm), C represents photoelastic constant (nm cm$^{-1}$MPa), and t' represents thickness of a sample (cm).

In the chemically strengthened glass I of the present invention, the compressive stress value ($CS_{90}$) at a portion of 90 μm deep from the glass surface is 25 MPa or more. By adjusting $CS_{90}$ to 25 MPa or more, the acute-angle object flaw strength can be made high. $CS_{90}$ is preferably 30 MPa or more, more preferably 35 MPa or more, further preferably 40 MPa or more, particularly preferably 45 MPa or more, and most preferably 50 MPa or more.

On the other hand, an upper limit of $CS_{90}$ is not particularly limited but, from the viewpoint of safety at fracture, it is, for example, 250 MPa or less, preferably 200 MPa or less, further preferably 150 MPa or less, particularly preferably 100 MPa or less, and most preferably 75 MPa or less.

In the chemically strengthened glass I of the present invention, from the viewpoint of improving the acute-angle object flaw strength, the compressive stress value ($CS_{100}$) at a portion of 100 μm deep from the glass surface is preferably 15 MPa or more. $CS_{100}$ is preferably 20 MPa or more, more preferably 23 MPa or more, further preferably 26 MPa or more, particularly preferably 30 MPa or more, and most preferably 33 MPa or more.

On the other hand, an upper limit of $CS_{100}$ is not particularly limited but, from the viewpoint of safety at fracture, it is, for example, 200 MPa or less, preferably 150 MPa or less, further preferably 100 MPa or less, particularly preferably 75 MPa or less, and most preferably 50 MPa or less.

$CS_{90}$ and $CS_{100}$ of the chemically strengthened glass can be appropriately adjusted, similarly to CS, by adjusting the chemical strengthening conditions, the glass composition, and the like.

In the chemically strengthened glass I of the present invention, $\Delta CS_{100-90}$ (unit: MPa/μm) is preferably 0.4 or more, in which $\Delta CS_{100-90}$ is calculated according to the following expression using $CS_{90}$ and $CS_{100}$.

$$\Delta CS_{100-90}=(CS_{90}-CS_{100})/(100-90)$$

By adjusting $\Delta CS_{100-90}$ to 0.4 or more, the bending strength after flawing with an acute-angle object (bending strength after flawing) can be made high. $\Delta CS_{100-90}$ is more preferably, below stepwise, 0.5 or more, 0.6 or more, 0.7 or more, 0.8 or more, 0.9 or more, 1.0 or more, 1.2 or more, 1.4 or more, 1.6 or more, 1.8 or more, or 2.0 or more. On the other hand, an upper limit of $\Delta CS_{100-90}$ is not particularly limited but, from the viewpoint of safety at fragmentation, for example, it is preferably 4.0 or less, below stepwise, 3.0 or less, 2.0 or less, 1.8 or less, 1.6 or less, or 1.4 or less.

In the chemically strengthened glass of the present invention, $\Delta CS_{DOL-20}$ (unit: MPa/μm) is preferably 0.4 or more, in which $\Delta CS_{DOL-20}$ is calculated according to the following expression using a compressive stress value $CS_{DOL-20}$ at a depth closer to a glass surface side by 20 μm from DOL.

$$\Delta CS_{DOL-20}=CS_{DOL-20}/20$$

By adjusting $\Delta CS_{DOL-20}$ to 0.4 or more, the bending strength after flawing with an acute-angle object (bending strength after flawing) can be made high. $\Delta CS_{DOL-20}$ is more preferably, below stepwise, 0.5 or more, 0.6 or more, 0.7 or more, 0.8 or more, 0.9 or more, 1.0 or more, 1.2 or more, 1.4 or more, or 1.5 or more. On the other hand, an upper limit of $\Delta CS_{DOL-20}$ is not particularly limited but, from the viewpoint of safety at fragmentation, it is, for example, 4.0 or less, preferably 3.0 or less, more preferably 2.0 or less, further preferably 1.7 or less, and typically 1.6 or less.

In the chemically strengthened glass I of the present invention, the depth of the compressive stress layer (DOL) is preferably 100 μm or more. In the case where DOL is 100 μm or more, resistance to cracking that may result from the acute-angle object flawing at the time of the drop onto sand or the like is improved. In order to enhance the strength of the chemically strengthened glass, DOL is preferably 100 μm or more and more preferably, below stepwise, 110 μm or more, 120 μm or more, 130 μm or more, 140 μm or more, 150 μm or more, or 160 μm or more.

On the other hand, an upper limit of DOL is not particularly limited but, from the viewpoint of safety at fracture, it is, for example, 200 μm or less, preferably 190 μm or less, further preferably 180 μm or less, and particularly preferably 150 μm or less.

DOL can be appropriately adjusted by adjusting the chemical strengthening conditions, the glass composition, and the like.

In the present Description, DOL is depth, from the glass surface, of a portion at which stress becomes zero in the stress profile, and is a value measured by means of a surface stress meter FSM-6000 manufactured by Orihara Manufacturing Co., Ltd. and analyzed by an attached program FsmV. Also, it can be measured by using a birefringence imaging system Abrio-IM manufactured by Tokyo Instruments, Inc. with a thinned sample as shown in FIG. 1(b).

In the chemically strengthened glass I of the present invention, the value of the area Sc (MPa·μm) of the compressive stress layer is preferably 20,000 MPa·μm or more. In the case where Sc is 20,000 MPa·μm or more, a high bending strength can be maintained even in a state that the glass is flawed with an acute-angle object. Sc is preferably 20,000 MPa·μm or more and, below stepwise, more preferably 22,000 MPa·μm or more, 24,000 MPa·μm or more, 26,000 MPa·μm or more, 28,000 MPa·μm or more, 30,000 MPa·μm or more, 32,000 MPa·μm or more, 34,000 MPa·μm or more, 36,000 MPa·μm or more, or 38,000 MPa·μm or more. On the other hand, an upper limit of Sc is not particularly limited but, from the viewpoint of safety at fragmentation, it is, for example, 50,000 MPa·μm or less and preferably 45,000 MPa·μm or less.

Sc (MPa·μm) of the chemically strengthened glass I of the present invention is defined as follows based on the values $Sc_F$ and $Sc_A$ resulting from the two kinds of measurement methods below.

$$Sc=Sc_F=1.515 \times Sc_A$$

Here, $Sc_F$ is a value calculated by using a value measured by means of a surface stress meter FSM-6000 manufactured by Orihara Manufacturing Co., Ltd. and analyzed by an attached program FsmV. $Sc_A$ is a value obtained by measurement using a birefringence imaging system Abrio-IM and a thinned sample, which is a method similar to the aforementioned $CS_A$ measurement.

Moreover, the area St (MPa·μm) of the internal tensile layer of the chemically strengthened glass I of the present invention is defined as follows based on the values $St_F$ and $St_A$ resulting from the two kinds of measurement methods below.

$$St=St_F=1.515 \times St_A$$

Here, $St_F$ is a value calculated by using a value measured by means of a surface stress meter FSM-6000 manufactured by Orihara Manufacturing Co., Ltd. and analyzed by an attached program FsmV. $St_A$ is a value obtained by measurement using a birefringence imaging system Abrio-IM and a thinned sample, which is a method similar to the aforementioned $CS_A$ measurement. Similarly to the above, a stress profile is prepared by the two methods, $St_F$ or $St_A$ is calculated, and thus St can be obtained.

FIG. 2 shows a conceptual view of Sc and St. Sc and St are theoretically an equal value and it is preferred to calculate them so as to be $0.95 < Sc/St < 1.05$.

Further, in the chemically strengthened glass I of the present invention, the value Sc/t MPa) obtained by dividing the area Sc (MPa·μm) of the compressive stress layer by the sheet thickness t (μm) is preferably 28 MPa or more. In the case where Sc/t is 28 MPa or more, the resistance to cracking that may result from the acute-angle object flawing at the time of drop onto sand and the like is improved. Sc/t is more preferably 30 MPa or more and further preferably, below stepwise, 32 MPa or more, 34 MPa or more, 36 MPa or more, 38 MPa or more, 40 MPa or more, 42 MPa or more, 44 MPa or more, 46 MPa or more, 48 MPa or more, or 50 MPa or more. On the other hand, an upper limit of Sc/t is not particularly limited but, from the viewpoint of safety at fragmentation, it is, for example, 60 MPa or less and preferably 55 MPa or less.

Moreover, in the chemically strengthened glass I of the present invention, the number of fragments generated within a size of 25 mm×25 mm is 20 or less in a fracture test according to an indenter indentation test under the condition of holding a load ranging from 5 kgf to 10 kgf for 15 seconds with a pyramidal diamond indenter in which an indenter angle of the facing angle is 60°. In the case where the number of fragments (fragmentation number) in the fracture test by the indenter indentation test is 20 or less, even when the glass is fractured, a high safety can be ensured. The fragmentation number is preferably 10 or less and more preferably 5 or less.

Furthermore, in the chemically strengthened glass I of the present invention, the bending strength after flawing is preferably 150 MPa or more. The degree of tensile stress generated on the cover glass surface at the time of the drop of a smart phone is about 150 MPa. Then, in the case where the bending strength is 150 MPa or more, fracture resulting from the stress generated by the drop can be prevented even after the occurrence of flawing with an acute-angle object. The bending strength after flawing is preferably 200 MPa or more and more preferably 250 MPa or more. As a method for flawing, there can be used an indenter indentation test where a diamond indenter (indenter angle of facing angle: 110°) is pressed or a similar method.

In the chemically strengthened glass I of the present invention, a fracture stress value σa (bending strength, unit: MPa) obtained by performing four-point bending test under conditions of an under spun of 30 mm, an upper spun of 10 mm, and a crosshead speed of 0.5 mm/minute after the glass surface is flawed by pressing a diamond indenter (indenter angle of facing angle: 110°) thereto for 15 seconds at a load of 0.5 kgf is preferably 150 MPa or more. σa is preferably 200 MPa or more, more preferably 250 MPa or more, and further preferably 300 MPa or more.

In the chemically strengthened glass I of the present invention, the fracture stress value σb (bending strength, unit: MPa) obtained by performing four-point bending test under conditions of an under spun of 30 mm, an upper spun of 10 mm, and a crosshead speed of 0.5 mm/minute after the glass surface is flawed by pressing a diamond indenter (indenter angle of facing angle: 110°) thereto for 15 seconds at a load of 1 kgf is preferably 150 MPa or more. σb is preferably 200 MPa or more, more preferably 250 MPa or more, and further preferably 300 MPa or more.

In the chemically strengthened glass I of the present invention, the fracture stress value σc (bending strength, unit: MPa) obtained by performing four-point bending test under conditions of an under spun of 30 mm, an upper spun of 10 mm, and a crosshead speed of 0.5 mm/minute after the glass surface is flawed by pressing a diamond indenter (indenter angle of facing angle: 110°) thereto for 15 seconds at a load of 2 kgf is preferably 150 MPa or more. σc is preferably 200 MPa or more, more preferably 250 MPa or more, and further preferably 300 MPa or more.

The following will describe the chemically strengthened glass II of the present invention in detail.

The chemically strengthened glass II of an embodiment is a chemically strengthened glass which satisfies the following expressions (1) and (2).

$$NM/Nh \geq 1.8 \quad (1)$$

$$KM/Kh \geq 3 \quad (2)$$

Here, NM, Nh, KM, and Kh each represents the following:

NM: a value obtained by converting a maximum value in an Na ion concentration profile in a sheet thickness direction of the chemically strengthened glass measured by EPMA to $Na_2O$ (% by weight);

Nh: a value obtained by converting a central value of sheet thickness in an Na ion concentration profile in a sheet thickness direction of the chemically strengthened glass measured by EPMA to $Na_2O$ (% by weight);

KM: a value obtained by converting a maximum value in a K ion concentration profile in a sheet thickness direction of the chemically strengthened glass measured by EPMA to $K_2O$ (% by weight); and Kh: a value obtained by converting a central value of sheet thickness in a K ion concentration profile in a sheet thickness direction of the chemically strengthened glass measured by EPMA to $K_2O$ (% by weight).

Incidentally, EPMA means Electron Probe Micro Analyzer (electron probe microanalyzer).

The value (Nh) obtained by converting a central value of sheet thickness in an Na ion concentration profile in a sheet thickness direction of the chemically strengthened glass measured by EPMA to $Na_2O$ (% by weight) is a value obtained by converting Na ion concentration at a center of sheet thickness to $Na_2O$ (% by weight) and, for example, in the case of a chemically strengthened glass having a sheet thickness of 0.8 mm, it is a value obtained by converting the Na ion concentration at a position of 0.4 mm from the surface to $Na_2O$ (% by weight). Kh is to be defined similarly.

$$(NM/Nh \geq 1.8) \quad (1)$$

As also shown in Examples to be mentioned later, according to the findings of the present inventors, a strong correlation is present between the compressive stress value at a portion of 20 to 40 μm deep from the glass surface and the bending strength after flawing and, a higher compressive stress value at a portion of 20 to 40 μm deep from the glass surface tends to result in a higher bending strength after flawing.

Further, as NM/Nh increases, the compressive stress value at a portion of 20 to 40 μm deep from the glass surface tends to increase. In the present invention, in order to achieve a sufficient bending strength after flawing for improving the failure rate of the cover glass, it is necessary that NM/Nh is 1.8 or more and, below stepwise, it is preferably 2 or more, 2.2 or more, 2.4 or more, 2.6 or more, 2.8 or more, 3 or more, 3.2 or more, or 3.4 or more. On the other hand, an upper limit of NM/Nh is not particularly limited but, from the viewpoint of safety at fragmentation, it is, for example, preferably 5 or less, more preferably 4.5 or less, and further preferably 4 or less.

$$(N0/Nh \geq 0.8) \quad (3)$$

Moreover, in the chemically strengthened glass of the present embodiment, N0/Nh that is a ratio of N0, which is a value obtained by converting a value on an outermost surface in an Na ion concentration profile in a sheet thickness direction of the chemically strengthened glass measured by EPMA to $Na_2O$ (% by weight), to the aforementioned Nh is preferably 0.8 or more.

According to the findings of the present inventors, as N0/Nh increases, the compressive stress value at a portion of 20 to 40 μm deep from the glass surface tends to increase. In the present embodiment, in order to achieve a sufficient bending strength after flawing for improving the failure rate of the cover glass, N0/Nh is preferably 0.8 or more and, below stepwise, it is more preferably 1 or more, 1.2 or more, 1.4 or more, 1.6 or more, 1.8 or more, 2 or more, 2.2 or more, 2.4 or more, 2.6 or more, 2.8 or more, or 3 or more. On the other hand, an upper limit of N0/Nh is not particularly limited but, from the viewpoint of safety at fragmentation, it is, for example, preferably 5 or less, more preferably 4.5 or less, and further preferably 4 or less.

$$(N0/NM \geq 0.4) \quad (4)$$

Furthermore, in the chemically strengthened glass of the present embodiment, N0/NM that is a ratio of the aforementioned N0 to the aforementioned NM is preferably 0.4 or more.

According to the findings of the present inventors, as N0/NM increases, the compressive stress value at a portion of 20 to 40 μm deep from the glass surface tends to increase. In the present embodiment, in order to achieve a sufficient bending strength after flawing for improving the failure rate of the cover glass, N0/NM is preferably 0.4 or more and, below stepwise, it is more preferably 0.5 or more, 0.6 or more, 0.7 or more, 0.8 or more, 0.9 or more, or 0.95 or more.

$$(KM/Kh \geq 3) \quad (2)$$

In the chemically strengthened glass II of the present embodiment, a large compressive stress is introduced into the glass surface layer by Na—K exchange where Na ions in the glass are exchanged with K ions to enhance the bending strength. From the viewpoint of improving strength reliability of the cover glass, the bending strength is preferably 400 MPa or more and, for achieving this, it is necessary that KM/Kh is 3 or more and, below stepwise, it is more preferably 3.5 or more, 4 or more, 4.5 or more, 5 or more, 5.5 or more, 6 or more, 6.5 or more, or 7 or more.

Moreover, the chemically strengthened glass II of the other one embodiment is a chemically strengthened glass which satisfies the following expressions (5) and (6).

$$NM-Nh \geq 2.2 \text{ (wt \%)} \quad (5)$$

$$KM-Kh \geq 3 \text{ (wt \%)} \quad (6)$$

$$(NM-Nh \geq 2.2 \text{ (wt \%)}) \quad (5)$$

As NM−Nh increases, the compressive stress value at a portion of 20 to 40 μm deep from the glass surface tends to increase. In the present embodiment, in order to achieve a sufficient bending strength after flawing for improving the failure rate of the cover glass, it is necessary that NM−Nh is 2.2 wt % or more and, below stepwise, it is preferably 2.4 wt % or more, 2.6 wt % or more, 2.8 wt % or more, 3 wt % or more, 3.2 wt % or more, 3.4 wt % or more, 3.6 wt % or more, 3.8 wt % or more, 4 wt % or more, 4.2 wt % or more, 4.4 wt % or more, 4.6 wt % or more, 4.8 wt % or more, or 5 wt % or more. On the other hand, an upper limit of NM−Nh is not particularly limited but, from the viewpoint of safety at fragmentation, it is, for example, preferably 7 wt % or less, more preferably 6.5 wt % or less, and further preferably 6 wt % or less.

$$(N0-Nh \geq -0.4 \text{ (wt \%)}) \quad (7)$$

Moreover, in the chemically strengthened glass II of the present embodiment, N0−Nh that is a difference between N0, which is a value obtained by converting a value on an outermost surface in an Na ion concentration profile in a sheet thickness direction of the chemically strengthened glass measured by EPMA to $Na_2O$ (% by weight), and the aforementioned Nh is preferably −0.4 wt % or more.

According to the findings of the present inventors, as N0−Nh increases, the compressive stress value at a portion of 20 to 40 μm deep from the glass surface tends to increase. In the present embodiment, in order to achieve a sufficient bending strength after flawing for improving the failure rate of the cover glass, N0−Nh is preferably 0.4 wt % or more and, below stepwise, it is more preferably 0 wt % or more, 0.5 wt % or more, 1 wt % or more, 1.5 wt % or more, 2 wt % or more, 2.5 wt % or more, 3 wt % or more, 3.5 wt % or more, 4 wt % or more, 4.5 wt % or more, or 5 wt % or more. On the other hand, an upper limit of N0−Nh is not particularly limited but, from the viewpoint of safety at fragmentation, it is, for example, preferably 7 wt % or less, more preferably 6.5 wt % or less, and further preferably 6 wt % or less.

$$(N0-NM \geq -3.5 \text{ (wt \%)}) \quad (8)$$

Furthermore, in the chemically strengthened glass II of the present embodiment, N0−NM that is a difference between the aforementioned N0 and the aforementioned NM is preferably −3.5 wt % or more.

According to the findings of the present inventors, as N0−NM increases, the compressive stress value at a portion of 20 to 40 μm deep from the glass surface tends to increase. In the present embodiment, in order to achieve a sufficient bending strength after flawing for improving the failure rate of the cover glass, N0−NM is preferably −3.5 wt % or more and, below stepwise, it is more preferably −3 wt % or more, −2.5 wt % or more, −2 wt % or more, −1.5 wt % or more, −1 wt % or more, −0.5 wt % or more, −0.25 wt % or more, or −0.1 wt % or more.

$$(KM-Kh \geq 3 \text{ (wt \%)}) \quad (6)$$

In the chemically strengthened glass II of the present embodiment, a large compressive stress is introduced into the glass surface layer to enhance the bending strength by Na—K exchange where Na ions in the glass are exchanged with K ions. From the viewpoint of improving strength reliability of the cover glass, the bending strength is preferably 400 MPa or more and, for achieving this, it is necessary that KM−Kh is 3 wt % or more and, below stepwise, it is preferably 3.5 wt % or more, 4 wt % or more, 4.5 wt % or more, 5 wt % or more, 5.5 wt % or more, 6 wt % or more, 6.5 wt % or more, 7 wt % or more, 7.5 wt % or more, 8 wt % or more, 8.5 wt % or more, 9 wt % or more, 9.5 wt % or more, or 10 wt % or more.

In the chemically strengthened glass II of the present invention, the surface compressive stress (CS) is preferably 400 MPa or more. For improving strength reliability of the cover glass, the bending strength of the glass is preferably 400 MPa or more. In the case where CS of the chemically strengthened glass is 400 MPa or more, the bending strength of the glass is 400 MPa or more. CS of the chemically strengthened glass is more preferably 500 MPa or more and further preferably 600 MPa or more.

On the other hand, an upper limit of CS of the chemically strengthened glass II is not particularly limited but, from the viewpoint of safety at fracture, it is, for example, 2,000 MPa or less, preferably 1,500 MPa or less, more preferably 1,000 MPa or less, and further preferably 800 MPa or less.

CS of the chemically strengthened glass can be appropriately adjusted by adjusting the chemical strengthening conditions, the glass composition, and the like.

CS of the chemically strengthened glass II of the present invention is defined as follows based on the values $CS_F$ and $CS_A$ resulting from the two kinds of measurement methods below. The same shall be applied to the compressive stress value ($CS_x$) at a portion of x μm deep from the glass surface.

$$CS = CS_F = 1.28 \times CS_A$$

Here, $CS_F$ is a value measured by means of a surface stress meter FSM-6000 manufactured by Orihara Manufacturing Co., Ltd. and determined by a program FsmV attached to the surface stress meter.

$CS_A$ is a value measured by the aforementioned procedure using a birefringence imaging system Abrio-IM manufactured by Tokyo Instruments, Inc.

In the chemically strengthened glass II of the present invention, the bending strength after flawing is preferably 200 MPa or more. When a smart phone or a tablet PC is dropped, tensile stress is generated on the cover glass surface and the degree reaches about 200 MPa. Since a flaw is generated on the cover glass surface by the collision with an acute-angle object or the like, the failure rate of the cover glass can be improved in the case where the bending strength is 200 MPa or more even in the state that a flaw is present.

Here, the bending strength after flawing means a fracture stress value (bending strength, unit: MPa) obtained by performing four-point bending test under conditions of an under spun of 30 mm, an upper spun of 10 mm, and a crosshead speed of 0.5 mm/minute after the glass surface is flawed by pressing a diamond indenter (indenter angle of facing angle: 110°) thereto for 15 seconds at a load of 0.5 kgf or 1 kgf.

In the chemically strengthened glass II of the present invention, the compressive stress value ($CS_{20}$) at a portion of 20 μm deep from the glass surface is preferably 60 MPa or more. In the case where $CS_{20}$ is 60 MPa or more, the bending test strength after flawing can be made 200 MPa or more and the failure rate of the cover glass is improved. $CS_{20}$ is more preferably 80 MPa or more and, below stepwise, it is further preferably 100 MPa or more, 120 MPa or more, 140 MPa or more, 160 MPa or more, 180 MPa or more, 200 MPa or more, 220 MPa or more, 240 MPa or more, 260 MPa or more, 280 MPa or more, or 300 MPa or more.

On the other hand, an upper limit of $CS_{20}$ is not particularly limited but, from the viewpoint of safety at fragmentation, it is, for example, 500 MPa or less, preferably 400 MPa or less, further preferably 350 MPa or less, and particularly preferably 320 MPa or less.

In the chemically strengthened glass II of the present invention, the compressive stress value ($CS_{40}$) at a portion of 40 μm deep from the glass surface is preferably 60 MPa or more. In the case where $CS_{40}$ is 60 MPa or more, the bending test strength after flawing can be made 200 MPa or more and the failure rate of the cover glass is improved. $CS_{40}$ is more preferably, below stepwise, 70 MPa or more, 80 MPa or more, 90 MPa or more, 100 MPa or more, 110 MPa or more, 120 MPa or more, 130 MPa or more, 150 MPa or more, 160 MPa or more, 170 MPa or more, or 180 MPa or more.

On the other hand, an upper limit of $CS_{40}$ is not particularly limited but, from the viewpoint of safety at fragmentation, it is, for example, 300 MPa or less, preferably 250 MPa or less, and further preferably 200 MPa or less.

$CS_{20}$ and $CS_{40}$ of the chemically strengthened glass can be appropriately adjusted similarly to CS, by adjusting the chemical strengthening conditions, the glass composition, and the like.

Moreover, in the chemically strengthened glass II of the present invention, the depth of the compressive stress layer (DOL) is preferably 100 μm or more. In the case where DOL is 100 μm or more, a remarkable strength improvement becomes possible against fracture caused by flawing with an acute-angle object at the time of drop onto sand or the like. DOL is more preferably 110 μm or more, further preferably 130 μm or more, and particularly preferably 150 μm or more.

On the other hand, an upper limit of DOL is not particularly limited but, from the viewpoint of safety at fracture, it is, for example, 200 μm or less, preferably 180 μm or less, and further preferably 160 μm or less.

DOL can be appropriately adjusted by adjusting the chemical strengthening conditions, the glass composition, and the like.

DOL of the chemically strengthened glass II of the present invention is depth, from the glass surface, of a portion at which stress becomes zero in the stress profile and is a value measured by means of a surface stress meter FSM-6000 manufactured by Orihara Manufacturing Co., Ltd. and analyzed by an attached program FsmV. Also, it can be measured by using a birefringence imaging system Abrio-IM manufactured by Tokyo Instruments, Inc. with a thinned sample as shown in FIG. 1(b).

Moreover, in the chemically strengthened glass II of the present invention, the number of fragments generated within a size of 25 mm×25 mm is 20 or less in a fracture test according to an indenter indentation test under the condition of holding a load ranging from 5 kgf to 10 kgf for 15 seconds with a pyramidal diamond indenter in which an indenter angle of the facing angle is 60°. In the case where the number of fragments (fragmentation number) in the fracture test by the indenter indentation test is 20 or less, even when the glass is fractured, a high safety can be ensured. The fragmentation number is preferably 30 or less and more preferably 40 or less.

Subsequently, the matrix composition of the chemically strengthened glass in the present invention will be described.

In the present Description, the matrix composition of the chemically strengthened glass means the composition of the glass before chemical strengthening (hereinafter sometimes referred to as matrix glass or glass for chemical strengthening). Here, it is considered that a portion having tensile stress (hereinafter also referred to as tensile stress portion) in the chemically strengthened glass is considered to be a portion which is not ion-exchanged. Accordingly, the tensile stress portion in the chemically strengthened glass has the same composition as the matrix glass and the composition of the tensile stress portion can be regarded as the matrix composition.

The following will describe suitable content of each component that may be contained in the matrix composition of the chemically strengthened glass. The content of each component is indicated in terms of molar percentage on the basis of oxides unless otherwise stated.

The composition of the glass can be simply determined by semi-qualitative analysis by an X-ray fluorescent method but, more precisely, can be measured by a wet analyzing method such as ICP emission analysis.

As the composition for the glass for chemical strengthening of the present invention (matrix composition of the chemically strengthened glass of the present invention), for example, there may be mentioned one containing from 50 to 80% of $SiO_2$, from 1 to 30% of $Al_2O_3$, from 0 to 5% of $B_2O_3$, from 0 to 4% of $P_2O_5$, from 3 to 20% of $Li_2O$, from 0 to 8% of $Na_2O$, from 0 to 10% of $K_2O$, from 3 to 20% of MgO, from 0 to 20% of CaO, from 0 to 20% of SrO, from 0 to 15% of BaO, from 0 to 10% of ZnO, from 0 to 1% of $TiO_2$, and from 0 to 8% of $ZrO_2$.

For example, there may be mentioned a glass containing from 63 to 80% of $SiO_2$, from 7 to 30% of $Al_2O_3$, from 0 to 5% of $B_2O_3$, from 0 to 4% of $P_2O_5$, from 5 to 15% of $Li_2O$, from 4 to 8% of $Na_2O$, from 0 to 2% of $K_2O$, from 3 to 10% of MgO, from 0 to 5% of CaO, from 0 to 20% of SrO, from 0 to 15% of BaO, from 0 to 10% of ZnO, from 0 to 1% of $TiO_2$, and from 0 to 8% of $ZrO_2$, and not containing $Ta_2O_5$, $Gd_2O_3$, $As_2O_3$, and $Sb_2O_3$.

$SiO_2$ is a component that constitutes the network of the glass. Also, it is a component that enhances chemical durability and is a component that reduces the generation of crack(s) when the glass surface is flawed (indented), and the content of $SiO_2$ is preferably 50% or more. The content of $SiO_2$ is more preferably, below stepwise, 54% or more, 58% or more, 60% or more, 63% or more, 66% or more, or 68% or more. On the other hand, in the case where the content of $SiO_2$ exceeds 80%, meltability remarkably decreases. The content of $SiO_2$ is 80% or less, more preferably 78% or less, further preferably 76% or less, particularly preferably 74% or less, and most preferably 72% or less.

$Al_2O_3$ is a component that improves the fragmentation property of the chemically strengthened glass. Here, high fragmentation property of a glass means that the number of fragments at the time of breakage of the glass is small. A glass having a high fragmentation property can be said to have a high safety, since fragments hardly scatter at the time of fracture. Moreover, since $Al_2O_3$ is a component effective for improving the ion exchange performance at the time of chemical strengthening and increasing the surface compressive stress after strengthening, the content of $Al_2O_3$ is preferably 1% or more. The content of $Al_2O_3$ is more preferably, below stepwise, 3% or more, 5% or more, 7% or more, 8% or more, 9% or more, 10% or more, 11% or more, 12% or more, or 13% or more. On the other hand, in the case where the content of $Al_2O_3$ exceeds 30%, acid resistance of the glass decreases or devitrification temperature becomes high. Also, viscosity of glass increases and meltability decreases. The content of $Al_2O_3$ is preferably 30% or less, more preferably 25% or less, further preferably 20% or less, particularly preferably 18% or less, and most preferably 15% or less. On the other hand, in the case where the content of $Al_2O_3$ is large, the temperature at glass melting increases and productivity decreases. In the case of considering the glass productivity, the content of $Al_2O_3$ is preferably 11% or less, below stepwise, 10% or less, 9% or less, 8% or less, or 7% or less.

$B_2O_3$ is a component that improves chipping resistance of the glass for chemical strengthening or chemically strengthened glass and improves the meltability of the glass. Although $B_2O_3$ is not essential, the content in the case of containing $B_2O_3$ is, for improving the meltability, preferably 0.5% or more, more preferably 1% or more, and further preferably 2% or more. On the other hand, in the case where the content of $B_2O_3$ exceeds 5%, striae may be generated at the time of melting and thus quality of the glass for chemical strengthening is prone to decrease. The content of $B_2O_3$ is more preferably 4% or less, further preferably 3% or less, and particularly preferably 1% or less. In order to enhance the acid resistance, $B_2O_3$ is preferably not contained.

$P_2O_5$ is a component that improves ion exchange performance and chipping resistance. $P_2O_5$ may not be contained but the content in the case of containing $P_2O_5$ is preferably 0.5% or more, more preferably 1% or more, and further preferably 2% or more. On the other hand, in the case where the content of $P_2O_5$ exceeds 4%, the fragmentation property of the glass remarkably decreases and the acid resistance remarkably decreases. The content of $P_2O_5$ is preferably 4% or less, more preferably 3% or less, further preferably 2% or less, and particularly preferably 1% or less. In order to enhance the acid resistance, $P_2O_5$ is preferably not contained.

$Li_2O$ is a component that forms surface compressive stress by ion exchange and is a component that improves the fragmentation property of the chemically strengthened glass.

In the case where Li ions at the glass surface are exchanged with Na ions to perform a chemical strengthening treatment so that the above $CS_{40}$ becomes 60 MPa or more, the content of $Li_2O$ is preferably 3% or more, more preferably 4% or more, further preferably 5% or more, particularly preferably 6% or more, and typically 7% or more. On the other hand, in the case where the content of $Li_2O$ exceeds 20%, the acid resistance of the glass remarkably decreases. The content of $Li_2O$ is preferably 20% or less, more preferably 18% or less, further preferably 16% or less, particularly preferably 15% or less, and most preferably 13% or less.

On the other hand, in the case where Na ions at the glass surface are exchanged with K ions to perform a chemical strengthening treatment so that the above $CS_{40}$ becomes 60 MPa or more, for the content of $Li_2O$ more than 3%, the degree of the compressive stress decreases and it becomes difficult to achieve $CS_{40}$ of 60 MPa or more. In this case, the content of $Li_2O$ is preferably 3% or less, more preferably 2% or less, further preferably 1% or less, particularly preferably 0.5% or less, and most preferably, $Li_2O$ is substantially not contained.

In the present Description, the phrase "substantially not contained" means that it is not contained except unavoidable impurities contained in raw materials and the like, i.e., it is not intentionally contained. Specifically, it indicates that the content in the glass composition is less than 0.1% by mol.

$Na_2O$ is a component that forms a surface compressive stress layer through ion exchange and enhances the meltability of the glass.

In the case where Li ions at the glass surface are exchanged with Na ions to perform a chemical strengthening treatment so that the above $CS_{40}$ becomes 60 MPa or more, $Na_2O$ may not be contained but, in the case of regarding the meltability of the glass as important, it may be contained. The content in the case of containing $Na_2O$ is preferably 1% or more. The content of $Na_2O$ is more preferably 2% or more and further preferably 3% or more. On the other hand, in the case where the content of $Na_2O$ exceeds 8% or more, the surface compressive stress formed by the ion exchange remarkably decreases. The content of $Na_2O$ is preferably 8% or less, more preferably 7% or less, further preferably 6% or less, particularly preferably 5% or less, and most preferably 4% or less.

On the other hand, in the case where Na ions at the glass surface are exchanged with K ions to perform a chemical strengthening treatment so that the above $CS_{40}$ becomes 60 MPa or more, Na is essential and the content thereof is 5% or more. The content of $Na_2O$ is preferably 5% or more, more preferably 7% or more, further preferably 9% or more, particularly preferably 11% or more, and most preferably 12% or more. On the other hand, in the case where the content of $Na_2O$ exceeds 20%, the acid resistance of the glass remarkably decreases. The content of $Na_2O$ is preferably 20% or less, more preferably 18% or less, further preferably 16% or less, particularly preferably 15% or less, and most preferably 14% or less.

In the case where Li ions and Na ions at the glass surface are simultaneously ion-exchanged with Na ions and K ions, respectively, by a method of immersion in a mixed molten salt of potassium nitrate and sodium nitrate or a similar method, the content of $Na_2O$ is preferably 10% or less, more preferably 9% or less, further preferably 7% or less, particularly preferably 6% or less, and most preferably 5% or less. Moreover, the content of $Na_2O$ is preferably 2% or more, more preferably 3% or more, and further preferably 4% or more.

$K_2O$ may be contained for enhancing the ion exchange performance and the like. The content in the case of containing $K_2O$ is preferably 0.5% or more, more preferably 1% or more, further preferably 2% or more, and particularly preferably 3% or more. On the other hand, in the case where the content of $K_2O$ exceeds 10%, the fragmentation property of the chemically strengthened glass decreases, so that the content of $K_2O$ is preferably 10% or less. The content of $K_2O$ is more preferably 8% or less, further preferably 6% or less, particularly preferably 4% or less, and most preferably 2% or less.

MgO is a component that increases the surface compressive stress of the chemically strengthened glass and is a component that improves the fragmentation property, and thus, it is preferably contained. The content in the case of containing MgO is preferably 3% or more, more preferably, below stepwise, 4% or more, 5% or more, 6% or more, 7% or more, or 8% or more. On the other hand, in the case where the content of MgO exceeds 20%, the glass for chemical strengthening is prone to be devitrified at the time of melting. The content of MgO is preferably 20% or less and more preferably, below stepwise, 18% or less, 15% or less, 14% or less, 13% or less, 12% or less, 11% or less, or 10% or less.

CaO is a component that enhances the meltability of the glass for chemical strengthening and is a component that improves the fragmentation property, and it may be contained. The content in the case of containing CaO is preferably 0.5% or more, more preferably 1% or more, further preferably 2% or more, particularly preferably 3% or more, and most preferably 5% or more. On the other hand, in the case where the content of CaO exceeds 20%, the ion exchange performance remarkably decreases, so that the content is preferably 20% or less. The content of CaO is more preferably 14% or less and further preferably 10% or less, 8% or less, 6% or less, 3% or less, and 1% or less.

SrO is a component that enhances the meltability of the glass for chemical strengthening and a component that improves the fragmentation property of the chemically strengthened glass, and it may be contained. The content in the case of containing SrO is preferably 0.5% or more, more preferably 1% or more, further preferably 2% or more, particularly preferably 3% or more, and most preferably 5% or more. On the other hand, in the case where the content of SrO exceeds 20%, the ion exchange performance remarkably decreases, so that the content is preferably 20% or less. The content of SrO is more preferably 14% or less and further preferably 10% or less, 8% or less, 6% or less, 3% or less, and 1% or less.

BaO is a component that enhances the meltability of the glass for chemical strengthening and a component that improves the fragmentation property of the chemically strengthened glass, and it may be contained. The content in the case of containing BaO is preferably 0.5% or more, more preferably 1% or more, further preferably 2% or more, particularly preferably 3% or more, and most preferably 5% or more. On the other hand, in the case where the content of BaO exceeds 15%, the ion exchange performance remarkably decreases. The content of BaO is preferably 15% or less and more preferably, below stepwise, 10% or less, 8% or less, 6% or less, 3% or less, or 1% or less.

ZnO is a component that enhances the meltability of the glass and may be contained. The content in the case of containing ZnO is preferably 0.25% or more and more preferably 0.5% or more. On the other hand, in the case where the content of ZnO exceeds 10%, the weathering resistance of the glass remarkably decreases. The content of ZnO is preferably 10% or less, more preferably 7% or less, further preferably 5% or less, particularly preferably 2% or less, and most preferably 1% or less.

$TiO_2$ is a component that improves the fragmentation property of the chemically strengthened glass and may be contained. The content in the case of containing $TiO_2$ is preferably 0.1% or more, more preferably 0.15% or more, and further preferably 0.2% or more. On the other hand, in the case where the content of $TiO_2$ exceeds 5%, the glass is prone to be devitrified at the time of melting and there is a concern of a decrease in the quality of the chemically strengthened glass. The content of $TiO_2$ is preferably 1% or less, more preferably 0.5% or less, and further preferably 0.25% or less.

$ZrO_2$ is a component that increases the surface compressive stress by ion exchange and has an effect of improving the fragmentation property of the glass for chemical strengthening, and it may be contained. The content in the case of containing $ZrO_2$ is preferably 0.5% or more and more preferably 1% or more. On the other hand, in the case where the content of $ZrO_2$ exceeds 8%, the glass is prone to be devitrified at the time of melting and there is a concern of a decrease in the quality of the chemically strengthened glass. The content of $ZrO_2$ is preferably 8% or less, more preferably 6% or less, further preferably 4% or less, particularly preferably 2% or less, and most preferably 1.2% or less.

$Y_2O_3$, $La_2O_3$, and $Nb_2O_5$ are components that improve the fragmentation property of the chemically strengthened glass and may be contained. The content of each one in the case of containing these components is preferably 0.5% or more, more preferably 1% or more, further preferably 1.5% or more, particularly preferably 2% or more, and most preferably 2.5% or more. On the other hand, in the case where the content of each of $Y_2O_3$, $La_2O_3$, and $Nb_2O_5$ exceeds 8%, the glass is prone to be devitrified at the time of melting and there is a concern of a decrease in the quality of the chemically strengthened glass. The content of each of $Y_2O_3$, $La_2O_3$, and $Nb_2O_5$ is preferably 8% or less, more preferably 6% or less, further preferably 5% or less, particularly preferably 4% or less, and most preferably 3% or less.

$Ta_2O_5$ and $Gd_2O_3$ may be contained in a small amount for improving the fragmentation property of the chemically strengthened glass but, since the refractive index and the reflectance increase, the content is preferably 1% or less and more preferably 0.5% or less, and further preferably, they are not contained.

Furthermore, for the use of the colored glass, a coloring component may be added within the range where the achievement of the desired chemical strengthening properties is not inhibited. Examples of the coloring component include $Co_3O_4$, $MnO_2$, $Fe_2O_3$, NiO, CuO, $Cr_2O_3$, $V_2O_5$, $Bi_2O_3$, $SeO_2$, $TiO_2$, $CeO_2$, $Er_2O_3$, $Nd_2O_3$, and the like as suitable ones.

The content of the coloring component is preferably in the range of 7% or less in total in terms of molar percentage on the basis of oxides. In the case where the content exceeds 7%, the glass is prone to be devitrified, so that the case is not desirable. The content is preferably 5% or less, more preferably 3% or less, and further preferably 1% or less. In the case where the visible ray transmittance of the glass takes preference, it is preferred that these components are substantially not contained.

As a refining agent at the time of melting the glass, $SO_3$, a chloride, a fluoride, or the like may be appropriately contained. $As_2O_3$ is preferably not contained. In the case of containing $Sb_2O_3$, the content is preferably 0.3% or less and more preferably 0.1% or less, and most preferably, it is not contained.

Also, the chemically strengthened glass of the present invention preferably has at least one kind selected from the group consisting of sodium ions, silver ions, potassium ions, cesium ions, and rubidium ions at the surface. Thereby, the compressive stress is induced at the surface and the glass is highly strengthened. Furthermore, in the case where the silver ions are present at the surface, an antibacterial property can be imparted.

In the present invention, it is preferred to select a matrix composition of the chemically strengthened glass so that DOL is 50 μm or more in the case where an ion exchange treatment is performed for 1 hour with a molten salt at 400° C. composed of $KNO_3$, $NaNO_3$, or a mixed salt of $KNO_3$ and $NaNO_3$ on a glass sheet having a thickness of 1 mm which has the matrix composition of the chemically strengthened glass and has been gradually cooled under the following conditions. Here, the gradual cooling is performed from a temperature T° C., which is 30° C. to 50° C. higher than the glass transition temperature, to (T−300)° C. at a cooling rate of 0.5° C./minute.

Furthermore, in the present invention, it is preferred to select a matrix composition of the chemically strengthened glass so that DOL is 70 μm or more in the case where an ion exchange treatment is performed for 1 hour with a molten salt at 425° C. composed of $KNO_3$, $NaNO_3$, or a mixed salt of $KNO_3$ and $NaNO_3$ on a glass sheet having a thickness of 1 mm which has the matrix composition of the chemically strengthened glass and has been gradually cooled under the following conditions. Here, the gradual cooling is performed from a temperature T° C., which is 30° C. to 50° C. higher than the glass transition temperature, to (T−300)° C. at a cooling rate of 0.5° C./minute.

In the case of such a matrix composition, the ion exchange rate is high and chemical strengthening can be performed for a short period of time.

In the case where the chemically strengthened glass of the present invention is a sheet-form (glass sheet), the sheet thickness (t) thereof is not particularly limited but is, from the viewpoint of enabling a remarkable improvement of strength by chemical strengthening, for example, 2 mm or less, preferably 1.5 mm or less, more preferably 1 mm or less, further preferably 0.9 mm or less, particularly preferably 0.8 mm or less, and most preferably 0.7 mm or less. Further, the sheet thickness is, form the viewpoint of obtaining an effect of a sufficient improvement of strength by chemical strengthening, for example, 0.1 mm or more, preferably 0.2 mm or more, more preferably 0.4 mm or more, and further preferably 0.5 mm or more.

The chemically strengthened glass of the present invention may have a shape other than the sheet-form, e.g., a fringed shape having a different thickness at outer periphery, depending on the products, uses, and the like to which the glass is applied. Moreover, the above glass sheet has two main surfaces and end surfaces that neighbors them to form the thickness and the two main surfaces may form flat faces that are parallel to each other. However, the configuration of the glass sheet is not limited thereto and, for example, the two main surfaces may not be parallel to each other or all or a part of one or both of the two main surfaces may be curved. More specifically, the glass sheet may be, for example, a warpage-free flat shape glass sheet or may be a curved glass sheet having a curved surface.

In the present invention, it is preferred that the Young's modulus of the glass for chemical strengthening is 70 GPa or more and also a difference between the compressive stress value ($CS_0$) on the outermost surface of the chemically strengthened glass and the compressive stress value ($CS_1$) at a portion of 1 μm deep from the glass surface is 50 MPa or less. In the case where they are controlled as such, warpage is difficult to occur when a polishing treatment of the glass surface is performed after the chemical strengthening treatment, so that the case is preferred.

The Young's modulus of the glass for chemical strengthening is more preferably 74 GPa or more, particularly preferably 78 GPa or more, and further preferably 82 GPa or more. An upper limit of the Young's modulus is not particularly limited but is, for example, 90 GPa or less and preferably 88 GPa or less. The Young's modulus can be measured, for example, by an ultrasonic pulse method.

The difference between $CS_0$ and $CS_1$ is preferably 50 MPa or less, more preferably 40 MPa or less, and further preferably 30 MPa or less.

Furthermore, $CS_0$ is preferably 300 MPa or more, more preferably 350 MPa or more, and further preferably 400 MPa or more. On the other hand, an upper limit of $CS_0$ is not particularly limited but is, for example, 1,200 MPa or less, preferably 1,000 MPa or less, and further preferably 800 MPa or less.

In addition, $CS_1$ is preferably 250 MPa or more, more preferably 300 MPa or more, and further preferably 350 MPa or more. On the other hand, an upper limit of CSI is not particularly limited but is, for example, 1,150 MPa or less, preferably 1,100 MPa or less, and further preferably 1,050 MPa or less.

The chemically strengthened glass of the present invention can be manufactured, for example, as follows. The following manufacturing method is an example in the case of manufacturing a sheet-form chemically strengthened glass.

First, a glass to be subjected to the aforementioned chemical strengthening treatment (glass for chemical strengthening) is prepared. For example, raw materials of respective components of the glass are blended and heated to melt in a glass melting furnace. Subsequently, the glass is homogenized by bubbling, stirring, addition of a refining agent, or the like, and then formed into a glass sheet having a predetermined thickness according to a conventionally known method, and thereafter gradually cooled.

Examples of the glass forming method includes, a float method, a press method, a fusion method, and a down-draw method. In particular, a float method suitable for mass production is preferred. Other continuous forming methods than a float method, that is, a fusion method and a down-draw method are also preferred.

Subsequently, the formed glass is subjected to grinding and polishing treatments as needed to form a glass substrate. In the case where the glass substrate is cut into a predetermined shape and size or chamfering of the glass substrate is performed, when the cutting and chamfering of the glass substrate are performed before the chemical strengthening treatment to be mentioned below, a compressive stress layer is formed also on the end surface by the subsequent chemical strengthening treatment, so that the case is preferred.

Then, after the formed glass substrate is subjected to the chemical strengthening treatment, the chemically strengthened glass of the present invention can be manufactured by washing and drying.

In the chemical strengthening treatment, by bringing the glass into contact with a molten liquid of a metal salt (e.g., potassium nitrate) containing metal ions having a large ionic radius (typically, Na ions or K ions) through immersion or the like, metal ions having a small ionic radius (typically, Na ions or Li ions) in the glass are substituted with metal ions having a large ionic radius.

The chemical strengthening treatment (ion exchange treatment) is not particularly limited but, for example, can be performed by immersing the glass in a molten salt heated to 360 to 600° C. for 0.1 to 500 hours. The heating temperature of the molten salt is preferably from 375 to 500° C. and the immersing time of the glass in the molten salt is preferably from 0.3 to 200 hours.

As the molten salt for performing the chemical strengthening treatment, there may be mentioned nitrate salts, sulfate salts, carbonate salts, chlorides, and the like. Of these, as the nitrate salts, there may be mentioned lithium nitrate, sodium nitrate, potassium nitrate, cesium nitrate, silver nitrate, and the like. As the sulfate salts, there may be mentioned lithium sulfate, sodium sulfate, potassium sulfate, cesium sulfate, silver sulfate, and the like. As the carbonate salts, there may be mentioned lithium carbonate, sodium carbonate, potassium carbonate, and the like. As the chlorides, there may be mentioned lithium chloride, sodium chloride, potassium chloride, cesium chloride, silver chloride, and the like. These molten salts may be used solely or a plurality of them may be used in combination.

In the present invention, the treatment conditions for the chemical strengthening treatment are not particularly limited and it is sufficient to select appropriate conditions considering the properties and compositions of the glass, the kind of the molten salt, the chemical strengthening properties such as the surface compressive stress (CS) and the depth of the compressive stress layer (DOL) which are desired for the finally obtained chemically strengthened glass, and the like.

Moreover, in the present invention, the chemical strengthening treatment may be performed only once or plural times of chemical strengthening treatments (multistage strengthening) may be performed under two or more different conditions. Here, for example, a chemical strengthening treatment is performed under a condition where CS becomes relatively low as a first-stage chemical strengthening treatment, and then, a chemical strengthening treatment is performed under a condition where CS becomes relatively high as a second-stage chemical strengthening treatment. Thus, an integrated value of compressive stress generated in the compressive stress layer can be suppressed low while increasing CS on the outermost surface of the chemically strengthened glass and, as a result, internal tensile stress (CT) can be suppressed low.

Especially, in order to perform the chemical strengthening treatment at a high ion exchange rate, it is preferred to exchange Li ions in the glass with Na ions (Li—Na exchange).

As the method for manufacturing the chemically strengthened glass II of the present invention, from the viewpoint of improving the bending strength after flawing, there is preferred a method for manufacturing the chemically strengthened glass comprising performing at least two stages of ion exchange treatments, in which $KNO_3$ concentration in the molten salt to be used in the first-stage ion exchange treatment is 60% by weight or more and $NaNO_3$ concentration in the molten salt to be used in the second-stage ion exchange treatment is 5% by weight or more.

From the viewpoint of improving the bending strength after flawing, the $KNO_3$ concentration in the molten salt to be used in the first-stage ion exchange treatment is preferably 60% by weight or more and more preferably, below stepwise, 70% by weight or more, 80% by weight or more, or 90% by weight or more. Also, an upper limit thereof is not particularly limited and may be, for example, 100% by weight, that is, the salt may be a molten salt composed of $KNO_3$ only. Here, according to the first-stage ion exchange treatment, Na—K exchange where Na ions in the glass are exchanged with K ions is mainly performed.

Also, from the viewpoint of improving the bending strength after flawing, the $NaNO_3$ concentration in the molten salt to be used in the second-stage ion exchange treatment is preferably 5% by weight or more and more preferably, below stepwise, 10% by weight or more, 20% by weight or more, 30% by weight or more, 40% by weight or more, 50% by weight or more, 60% by weight or more, 70% by weight or more, 80% by weight or more, or 90% by weight or more. Also, an upper limit thereof is not particularly limited and may be, for example, 100% by weight, that is, the salt may be a molten salt composed of $NaNO_3$ only. Here, according to the second-stage ion exchange treatment, at least, Li—Na exchange where Li ions in the glass are exchanged with Na ions is performed.

The chemically strengthened glass of the present invention is particularly useful as a cover glass to be used in, such as mobile devices such as mobile phones, smart phones, personal digital assistant (PDA), and tablet terminals. Furthermore, it is also useful, not for purpose of carrying, as a cover glass for display devices such as television (TV), personal computers (PC) and touch panels, a building material for walls of elevators, walls (whole face displays) of architectures such as houses and buildings, window panes, and the like, a table top, an interior of automobiles, aircraft and the like, and a cover glass thereof.

Also it is useful in uses as non-tabular housings having curved shape by bending or forming.

EXAMPLES

The following will describe the present invention with reference to Examples but the present invention is not limited thereby. With regard to the measurement results in Tables, a blank column indicates that the data is not measured.

(Production of Chemically Strengthened Glass)

Glasses of Examples 1 to 15 shown in Table 2 were produced as follows.

First, glass sheets of glass 1, glass 3, glass 4, glass 6, and glass 7 each having a composition shown in Table 1 in terms of molar percentage on the basis of oxides were produced by platinum crucible melting. Glass materials that are generally used, such as oxides, hydroxides, carbonates, and nitrates were suitably selected and were weighed so as to be 1,000 g as the resultant glass. Next, the mixed material was put in a platinum crucible, set in an electric resistance heating furnace at 1500 to 1700° C. and melted therein for about 3 hours, to be defoamed and homogenized. The resultant molten glass was cast into a mold, kept therein at a temperature of glass transition temperature +50° C. for 1 hour, and then cooled to room temperature at a rate of 0.5° C./minute, to obtain a glass block. The resultant glass block was cut and ground, and finally both surfaces thereof were mirror-finished to obtain a sheet-form glass having a desired shape. The sheet thickness t (mm) is shown in Table 2.

Glass sheets having a composition of each of glass 2 and glass 5 shown in Table 1 in terms of molar percentage on the basis of oxides were produced in a float furnace. Glass materials that are generally used, such as oxides, hydroxides, carbonates, and nitrates were suitably selected and melted in the melting furnace and forming was performed by a float method so that the sheet thickness was from 1.1 to 1.3 mmt. The resultant sheet glass was cut and ground, and finally both surfaces thereof were mirror-finished to obtain a sheet-form glass having a desired shape. The thickness t (mm) is shown in Table 2.

TABLE 1

| (mol %) | Glass 1 | Glass 2 | Glass 3 | Glass 4 | Glass 5 | Glass 6 | Glass 7 |
|---|---|---|---|---|---|---|---|
| $SiO_2$ | 70 | 64.5 | 56.1 | 68 | 67.6 | 69 | 70 |
| $Al_2O_3$ | 10 | 12 | 17.2 | 10 | 10.1 | 9 | 7.5 |
| $B_2O_3$ | | 0 | | | | | |
| $P_2O_5$ | | | | 6.8 | | | |
| $Li_2O$ | 10 | 12.8 | | | | 9.5 | 8 |
| $Na_2O$ | 3 | 5.5 | 16.8 | 8 | 14.2 | 4.5 | 5.3 |
| $K_2O$ | 1 | 3.4 | 0.3 | | 0.1 | 1 | 1 |
| MgO | 5 | 0 | 2.7 | 14 | 8 | 6 | 7 |
| CaO | | 0 | | | 0.1 | | 0.2 |
| SrO | | 0 | | | | | |
| BaO | | 0 | | | | | |
| ZnO | | | | | | | |
| $TiO_2$ | | | | | | 0.04 | 0.04 |
| $ZrO_2$ | 1 | 1.8 | | | 0.04 | 1 | 1 |
| Sum | 100 | 100 | 99.9 | 100 | 100 | 100 | 100 |
| Density (g/cm³) | 2.42 | | 2.40 | 2.45 | 2.44 | 2.44 | 2.44 |
| E (GPa) | 84.2 | | 68.9 | 80.9 | 72.0 | 84.1 | 82.6 |
| CS (µm) at strengthening of 1 mmt $NaNO_3$ 400° C. 1 hour | 344 | 286 | | | | | |
| DOL (µm) at strengthening of 1 mmt $NaNO_3$ 400° C. 1 hour | 77 | 58 | | | | | |

Subsequently, a chemical strengthening treatment was performed on glass 1 to glass 4 under conditions described in Table 2, thereby obtaining chemically strengthened glasses of Example 1 to Example 15.

A chemical strengthening treatment was performed on glass 6 and glass 7 under conditions described in Table 3, thereby obtaining chemically strengthened glasses of Example 31 to Example 38.

Examples 1 to 9 and Examples 31 to 38 are Invention Examples of the chemically strengthened glass I of the present invention and Examples 10 to 15 are Comparative Examples.

Moreover, a chemical strengthening treatment was performed on glass 1 or glass 5 under conditions described in Table 4, thereby obtaining chemically strengthened glasses of Examples 16 to 26.

The following will describe the chemically strengthened glasses of Example 1 to Example 15 and Example 31 to Example 38.

For the chemically strengthened glasses, the surface compressive stress CS (unit: MPa), thickness of the compressive stress layer DOL (unit: µm), internal tensile stress CT (unit: MPa), Compressive stress value $CS_x$ at a portion of x µm deep from glass surface (unit: MPa), area Sc of the compressive stress layer (unit: MPa·µm), Sc/t (unit: MPa), area St of the internal tensile layer (unit: MPa·µm), St/t (unit: MPa), $\Delta CS_{100-90}$ (unit: MPa/µm), $CS_{DOL-20}$ (unit: MPa), and $\Delta CS_{DOL-20}$ (unit: MPa/µm) were measured or calculated.

CS is defined as follows by values $CS_F$ and $CS_A$ resulting from the following two kinds of measurement methods. The same shall be applied to the compressive stress value ($CS_x$) at a portion of x µm deep from glass surface.

$$CS = CS_F = 1.28 \times CS_A$$

Here, $CS_F$ is a value measured by means of a surface stress meter FSM-6000 manufactured by Orihara Manufacturing Co., Ltd. and determined by a program FsmV attached to the surface stress meter. $CS_A$ is a value measured by the aforementioned procedure using a birefringence imaging system Abrio-IM manufactured by Tokyo Instruments, Inc. and a thinned sample.

CT is defined as follows by values $CT_F$ and $CT_A$ resulting from the following two kinds of measurement methods.

$$CT = CT_F = 1.28 \times CT_A$$

Here, $CT_F$ is a value measured by means of a surface stress meter FSM-6000 manufactured by Orihara Manufacturing Co., Ltd. and determined by a program FsmV attached to the surface stress meter. $CT_A$ is a value measured by the aforementioned procedure using a birefringence imaging system Abrio-IM manufactured by Tokyo Instruments, Inc. and a thinned sample.

The St value is defined as follows using a value $St_F$ measured by means of a surface stress meter FSM-6000 manufactured by Orihara Manufacturing Co., Ltd. and analyzed by an attached program FsmV or a value $St_A$ obtained by the measurement using a birefringence imaging system Abrio-IM manufactured by Tokyo Instruments, Inc. and a thinned sample.

$$St = St_F = 1.515 \times St_A$$

(Indenter Indentation Test) For a chemically strengthened glass having a size of 25 mm×25 mm×0.8 mm (800 µm) in thickness, the chemically strengthened glass was fractured by an indenter indentation test under the condition of holding a load ranging from 5 to 10 kgf for 15 seconds with a diamond indenter in which an indenter angle of the facing angle is 60° and the number of fragments (fragmentation number) of the glass after fracture was measured. These results are shown in Table 2.

From these results, in the chemically strengthened glasses of Example 1 to Example 9 and Example 11 to Example 14, the fragmentation number in the fracture test by the indenter indentation test was 20 or less and thus they were highly safe glasses at the time of fracture. On the other hand, in the chemically strengthened glasses of Example 10 and Example 15, the fragmentation number greatly exceeds 20 and thus they were glasses poor in safety at the time of fracture.

(On-Sand Drop Test)

Subsequently, for the chemically strengthened glasses, the on-sand drop test was performed by the following test method to measure an average crack height (unit: mm).

FIG. 3 indicates a schematic view illustrating a test method of the on-sand drop test.

First, a chemically strengthened glass 13 (50 mm×50 mm×0.8 (mm) in thickness) was attached to a hard Nylon-made mock plate 11 (50 mm×50 mm×18 (mm) in thickness, weight: 54 g) through a sponge double-sided tape 12 (#2310 manufactured by Sekisui Chemical Co., Ltd., 50 mm×50 mm×3 mm in thickness) to produce a measurement sample 1. Next, 1 g of silica sand 22 (No. 5 silica sand manufactured by Takeori Company) was scattered uniformly over a SUS plate 21 having a size of 15 cm×15 cm and the produced measurement sample 1 in which the chemically strengthened glass 13 is downward was dropped from a predetermined height (drop height) to the surface of the SUS plate 21 on which silica sand 22 was scattered. The drop test was carried out starting from a drop height: 10 mm with increasing the height by 10 mm at each time, and the height at which the chemically strengthened glass 13 was cracked was regarded as crack height (unit: mm). The drop test was carried out 5 to 10 times for each Example and an average value of the crack height in the drop test was regarded as an average crack height (unit: mm). These results are shown in Table 2.

FIG. 4 indicates a graph plotting a relationship between a compressive stress value $CS_{90}$ (unit: MPa) at a portion of 90 μm deep from grass surface and an average crack height (unit: mm) for the chemically strengthened glass.

From FIG. 4, it is revealed that the average crack height has high correlation with internal compressive stress $CS_{90}$. When $CS_{90}$ is 25 MPa or more, the average crack height is about 300 mm or more and it is revealed that a remarkable improvement in strength (acute-angle object flaw strength) can be achieved.

Moreover, from Table 2, in the case where the value Sc/t (MPa) obtained by dividing the area Sc (MPa·μm) of the compressive stress layer by the sheet thickness t (μm) is 28 or more, the average crack height is about 300 mm or more and it is revealed that a remarkable improvement in strength (acute-angle object flaw strength) can be achieved.

<Four-Point Bending Test after Flawing or at Non-Flawing>

A chemically strengthened glass having a size of 40 mm×5 mm×0.8 (mm) in thickness was not flawed or the glass surface was flawed by pressing a diamond indenter (indenter angle of the facing angle: 110°) at a load of 0.5 kgf, 1 kgf, or 2 kgf for 15 seconds. Then, a four-point bending test was performed under conditions of an under spun of 30 mm, an upper spun of 10 mm, and a crosshead speed of 0.5 mm/minute and the fracture stress (MPa) at non-flawing and under each flawing condition was measured. The fracture stress values (bending strength, unit: MPa) in the case of performing the four-point bending test at non-flawing and under each flawing condition are shown in Table 2.

FIG. 5 indicates a graph plotting a relationship between $\Delta CS_{100-90}$ (unit: MPa/μm) and fracture stress (MPa) under each flawing condition for the chemically strengthened glasses of Examples 4, 6, 8 to 10, and 15.

As mentioned above, a tensile stress of about 150 MPa is generated on the glass surface at the time of drop of a smart phone. In the case where the glass has a fracture stress of 150 MPa or more, the cover glass can be prevented from cracking at the drop even after flawing. From FIG. 5, in the case where $\Delta CS_{100-90}$ is 0.4 or more, it is revealed that the bending stress after flawing at a load of 0.5 kgf or 1 kgf is 150 MPa or more. Moreover, in the case where $\Delta CS_{100-90}$ is 0.9 or more, it is revealed that the bending stress after flawing at 2 kgf is 150 MPa or more.

(Ion Exchange Rate)

A chemical strengthening treatment was performed on the glass 1 to glass 4 under the chemical strengthening treatment conditions described in the lower column of Table 2, and DOL (μm) in each case was measured. These results are collectively shown in Table 2. Incidentally, for example, "DOL (μm) at strengthening of 1 mmt $KNO_3$ 400° C. 1 hour" indicates DOL (μm) in the case where a chemical strengthening treatment is performed on a glass having a thickness of 1 mm under conditions of 400° C. and 1 hour using a molten salt of $KNO_3$.

TABLE 2

| No. | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 |
|---|---|---|---|---|---|---|---|---|---|---|---|---|---|---|---|
| Glass | Glass 1 | Glass 1 | Glass 1 | Glass 1 | Glass 1 | Glass 1 | Glass 1 | Glass 1 | Glass 1 | Glass 1 | Glass 2 | Glass 2 | Glass 2 | Glass 3 | Glass 4 |
| Sheet thickness (μm) of glass for stress measurement and on-sand drop | 800 | 800 | 800 | 800 | 800 | 800 | 800 | 800 | 800 | 800 | 800 | 800 | 800 | 843 | 800 |
| First-stage strengthening conditions NaNO3 (wt %) | 2 | 2 | 2 | 3.5 | | 5 | 7.5 | 10 | | 5 | 5 | 5 | 5 | 50 | 20 |
| KNO3 (wt %) | 98 | 98 | 98 | 96.5 | 100 | 95 | 92.5 | 90 | 100 | 95 | 95 | 95 | 95 | 50 | 80 |
| Temperature (° C.) | 400 | 450 | 450 | 450 | 425 | 450 | 450 | 450 | 450 | 450 | 380 | 380 | 420 | 450 | 500 |
| Time (h) | 6 | 6 | 6 | 6 | 1.5 | 7.5 | 2.5 | 1.5 | 6 | 6 | 8 | 15 | 15 | 20 | 578 |
| Second-stage strengthening conditions NaNO3 (wt %) | 100 | 100 | 100 | 100 | 5 | | | | 100 | 100 | | | | 4 | 100 |
| KNO3 (wt %) | 425 | 425 | 425 | 425 | 95 | | | | 425 | 425 | | | | 96 | 500 |
| Temperature (° C.) | 1 | 3 | 3.25 | 2.5 | 450 | | | | 5 | 2 | | | | 400 | 3 |
| Time (h) | 2 | 2 | 12 | 6 | 6 | 2 | 6 | 2 | 4 | 322 | 2 | 2 | 2 | 0.33 | 500 or more |
| Fragmentation number 25 mm square | 616 | 539 | 562 | 487 | 541 | 691 | 632 | 715 | 302 | 554 | 100.7 | 129.5 | 143.4 | 2 | 647.205 |
| CS (MPa) | | | | | | 691 | | 715 | | 554 | | | | 887 | 647.205 |
| CSF (MPa) | 115.1 | 127.0 | 123.5 | 130.0 | 173.2 | 164.2 | 129.0 | 119.6 | 123.5 | 148.8 | | | | 887 | 139.77 |
| DOL (pm) | 53.8 | 47.6 | 57.4 | 60.3 | 60.5 | 34.7 | 56.7 | 43.3 | 47.6 | 64.6 | 26.8 | 32.4 | 34.0 | 94.3 | |
| CT_A (MPa) | 22600 | 18807 | 21400 | 21200 | 19280 | 15770 | 23000 | 21300 | 20900 | 25810 | 12520 | 14690 | 12300 | | |
| Sc_A (MPa·μm) | 22.6 | 24.9 | 30.0 | 31.2 | 43.2 | 32.8 | 37.2 | 32.8 | 28.8 | 40.9 | 7.4 | 21.7 | 16.4 | | |
| CS_A90 (MPa) | 12.9 | 18.4 | 20.3 | 22.8 | 40.4 | 29.5 | 26.7 | 21.1 | 17.8 | 32.0 | 3.3 | 14.1 | 13.6 | | |
| CS_A100 (MPa) | 34239 | 28493 | 32421 | 32118 | 29209 | 23892 | 34845 | 32270 | 31664 | 39102 | 18968 | 22255 | 18635 | | |
| Sc (MPa·μm) | 42.8 | 35.6 | 40.5 | 40.1 | 36.5 | 29.9 | 43.6 | 40.3 | 39.6 | 48.9 | 23.7 | 27.8 | 23.3 | | |
| Sc/t (MPa) | 28.9 | 31.8 | 38.4 | 40.0 | 55.3 | 42.0 | 47.6 | 42.0 | 36.9 | 52.3 | 9.4 | 27.8 | 21.0 | | 99.7 |
| CS90 (MPa) | 16.5 | 23.5 | 26.0 | 29.2 | 51.7 | 37.8 | 34.2 | 27.0 | 22.8 | 41.0 | 4.2 | 18.1 | 17.4 | 7.4 | 78.2 |
| CS100 (MPa) | 68.9 | 61.0 | 73.4 | 77.1 | 77.4 | 44.5 | 72.6 | 55.4 | 60.9 | 82.7 | 34.2 | 41.4 | 43.5 | 45 | 113.1 |
| CT (MPa) | 25.0 | 17.3 | 20.5 | 16.4 | 10.6 | 14.6 | 23.0 | 27.0 | 21.4 | 17.2 | 18.6 | 14.1 | 11.1 | 34.3 | 39.2 |
| CS_DOL-20 (MPa) | 1.25 | 0.83 | 1.24 | 1.08 | 0.36 | 0.42 | 1.34 | 1.50 | 1.41 | 1.14 | 0.52 | 0.97 | 0.36 | 1.72 | 2.15 |
| ACS_100-90 (MPa/Mm) | 1.25 | 0.86 | 1.02 | 0.82 | 0.53 | 0.73 | 1.15 | 1.35 | 1.07 | 0.86 | 0.93 | 0.70 | 0.56 | | 1.96 |
| ACS_DOL-20 (MPa/Mm) | 413 | 460 | 478 | 497 | 360 | 456 | 313 | 406 | 488 | 509 | 256 | 222 | | 150 | 600 |
| 0.8 t 4PB average (MPa) | 597 | 535 | 554 | 493 | 536 | 647 | 610 | 684 | 345 | 550 | | | | | 653 |
| 0.8 t flawing 4PB average 0.5 kgf (MPa) | | | | 311 | | 194 | | 393 | 339 | 383 | | | | | 616 |
| Flawing at 1 kgf | | | | 239 | | 175 | | 350 | 305 | 307 | | | | | 344 |
| Flawing at 2 kgf | | | | 128 | | 113 | | 208 | 192 | 210 | | | | | 330 |
| 0.8 t sand average crack height | | | | | 76.9 | | | | | | | 58 | | 21 | 5 or less |
| DOL (μm) at strengthening of 1 mmt NaNO3 400° C. 1 hour | | | | | 92.8 | | | | | | | | | | |
| DOL (μm) at strengthening of 1 mmt KNO3 400° C. 1 hour | | | | | | | | | | | | | | | |
| DOL (μm) at strengthening of 1 mmt NaNO3 425° C. 1 hour | | | | | | | | | | | | | | | |
| DOL (μm) at strengthening of 1 mmt KNO3 425° C. 1 hour | | | | | | | | | | | | | | | 5 or less |

TABLE 3

| No. | | Ex. 31 | Ex. 32 | Ex. 33 | Ex. 34 | Ex. 35 | Ex. 36 | Ex. 37 | Ex. 38 |
|---|---|---|---|---|---|---|---|---|---|
| Glass | | Glass 6 | Glass 6 | Glass 6 | Glass 6 | Glass 7 | Glass 7 | Glass 7 | Glass 7 |
| Sheet thickness (μm) of glass for stress measurement and on-sand drop | | 800 | 800 | 800 | 800 | 800 | 800 | 800 | 800 |
| First-stage strengthening conditions | NaNO3 (wt %) | | | | | | | | |
| | KNO3 (wt %) | 100 | 100 | 100 | 100 | 100 | 100 | 100 | 100 |
| | Temperature (° C.) | 450 | 450 | 450 | 450 | 450 | 450 | 450 | 450 |
| | Time (h) | 1 | 1 | 1 | 1 | 1 | 1 | 1 | 1 |
| Second-stage strengthening conditions | NaNO3 (wt %) | | 1 | 2 | 5 | | 1 | 2 | 5 |
| | KNO3 (wt %) | 100 | 99 | 98 | 95 | 100 | 99 | 98 | 95 |
| | Temperature (° C.) | 450 | 450 | 450 | 450 | 450 | 450 | 450 | 450 |
| | Time (h) | 1.5 | 1.5 | 1.5 | 1.5 | 1.5 | 1.5 | 1.5 | 1.5 |
| Fragmentation number 25 mm square | | 2 | 2 | 2 | 2 | 2 | 2 | 2 | 2 |
| CS (MPa) | | 909.955 | 861.78 | 859.4 | 792.156 | 884.678 | 850.817 | 821.24 | 749.23 |
| $CS_F$ (MPa) | | 909.955 | 861.78 | 859.4 | 792.156 | 884.678 | 850.817 | 821.24 | 749.23 |
| DOL (μm) | | 149 | 143 | 147 | 142 | 134 | 139 | 135 | 132 |
| $CT_A$ (MPa) | | 43.9 | 48.9 | 44.6 | 52.6 | 37.6 | 38.0 | 38.3 | 41.3 |
| $Sc_A$ (MPa · μm) | | 15195 | 19443 | 16191 | 21666 | 12935 | 13516 | 13637 | 16221 |
| $CS_{A90}$ (MPa) | | 36.6 | 42.3 | 38.9 | 47.1 | 24.3 | 27.7 | 29.4 | 30.2 |
| $CS_{A100}$ (MPa) | | 30.8 | 34.3 | 32.2 | 37.5 | 18.4 | 21.3 | 21.6 | 22.8 |
| Sc (MPa · μm) | | 23020 | 29456 | 24529 | 32824 | 19597 | 20477 | 20660 | 24574 |
| Sc/t (MPa) | | 28.8 | 36.8 | 30.7 | 41.0 | 24.5 | 25.6 | 25.8 | 30.7 |
| $CS_{90}$ (MPa) | | 46.8 | 54.2 | 49.8 | 60.2 | 31.1 | 35.5 | 37.6 | 38.6 |
| $CS_{100}$ (MPa) | | 39.5 | 43.9 | 41.3 | 48.1 | 23.5 | 27.3 | 27.6 | 29.2 |
| CT (MPa) | | 56.2 | 62.6 | 57.1 | 67.3 | 48.1 | 48.6 | 49.0 | 52.9 |
| $CS_{DOL-20}$ (MPa) | | 13.8 | 19.6 | 15.3 | 19.0 | 13.6 | 13.5 | 15.1 | 17.6 |
| $\Delta CS_{100-90}$ (MPa/μm) | | 0.74 | 1.03 | 0.85 | 1.22 | 0.76 | 0.82 | 1.00 | 0.94 |
| $\Delta CS_{DOL-20}$ (MPa/μm) | | 0.69 | 0.98 | 0.77 | 0.95 | 0.68 | 0.68 | 0.76 | 0.88 |
| 0.8 t sand average crack height | | | | | | | | | |
| 0.8 t 4PB average (MPa) | | | | | | | | | |
| 0.8 t flawing 4PB average (MPa) | Flawing at 0.5 kgf | | | | | | | | |
| | Flawing at 1 kgf | | | | | | | | |
| | Flawing at 2 kgf | | | | | | | | |
| DOL (μm) at strengthening of 1 mmt NaNO₃ 400° C. 1 hour | | | | | | | | | |
| DOL (μm) at strengthening of 1 mmt KNO₃ 400° C. 1 hour | | | | | | | | | |
| DOL (μm) at strengthening of 1 mmt NaNO₃ 425° C. 1 hour | | | | | | | | | |
| DOL (μm) at strengthening of 1 mmt KNO₃ 425° C. 1 hour | | | | | | | | | |

The following will describe the chemically strengthened glasses of Example 16 to Example 25.

(Measurement of $CS_x$)

For each of the chemically strengthened glasses of Examples 16 to 25, the compressive stress value $CS_x$ (unit: MPa) at a portion of x μm deep from the glass surface was measured by a method using the aforementioned birefringence imaging system Abrio-IM manufactured by Tokyo Instruments, Inc. and a thinned sample. Results thereof are shown in Table 4. For the chemically strengthened glass of Example 26, CS and DOL were measured by a surface stress meter (FSM-6000 manufactured by Orihara Manufacturing Co., Ltd.). CS was 95.7 MPa and DOL was 34.6 μm.

(Measurement by EPMA)

For the chemically strengthened glasses, each of the following N0, NM, Nh, K0, KM, and Kh were calculated from the Na ion concentration profile and the K ion concentration profile obtained by using an electron probe microanalyzer (Electron Probe Micro Analyzer: EPMA), and were shown in Table 1. A cross-section of each chemically strengthened glass was mirror-polished and was coated with C in about 30 nm, and then the resultant glass was subjected to the EPMA analysis. As EPMA, JXA-8500F manufactured by JOEL Ltd. was used and a profile of the number of counts of characteristic X-rays for each element was obtained at an acceleration voltage of 15 kV, a probe current of 30 nA, a probe diameter of 1 μmϕ, a step interval of 1 μm, a measurement time of 1 s, a dispersive crystal TAPH (Na Kα ray, peak position: 129.55 mm), and PETH (K Kα ray, peak position: 119.75 mm). Further, the number of counts of each element at a center of the sheet thickness of the sample was converted to % by weight in the sample composition to prepare an ion concentration profile.

N0: a value obtained by converting a value on the outermost surface in an Na ion concentration profile in a sheet thickness direction of the chemically strengthened glass measured by EPMA to $Na_2O$ (% by weight)

NM: a value obtained by converting a maximum value in an Na ion concentration profile in a sheet thickness direction of the chemically strengthened glass measured by EPMA to $Na_2O$ (% by weight)

Nh: a value obtained by converting a central value of sheet thickness in an Na ion concentration profile in a sheet thickness direction of the chemically strengthened glass measured by EPMA to $Na_2O$ (% by weight)

K0: a value obtained by converting a value on the outermost surface in a K ion concentration profile in a sheet thickness direction of the chemically strengthened glass measured by EPMA to $K_2O$ (% by weight)

KM: a value obtained by converting a maximum value in a K ion concentration profile in a sheet thickness direction of the chemically strengthened glass measured by EPMA to $K_2O$ (% by weight)

Kh: a value obtained by converting a central value of sheet thickness in a K ion concentration profile in a sheet thickness direction of the chemically strengthened glass measured by EPMA to $K_2O$ (% by weight).

Moreover, from the above results, N0/Nh, NM/Nh, N0/NM, N0–Nh, NM–Nh, N0–NM, K0/Kh, KM/Kh, K0/KM, and KM–Kh were each calculated and shown in Table 1.

<Four-Point Bending Test after Flawing or at Non-Flawing>

A diamond indenter (indenter angle of the facing angle: 110°) was pressed to a chemically strengthened glass at a load of 0.5 kgf, 1 kgf, 1.5 kgf, or 2 kgf for 15 seconds, thereby flawing the glass surface. Then, a four-point bending test was performed under conditions of an under spun of 30 mm, an upper spun of 10 mm, and a crosshead speed of 0.5 mm/minute and fracture stress (MPa) under each flawing condition was measured. The fracture stress values (bending strength, unit: MPa) in the case of performing the four-point bending test at non-flawing and at each load of the indenter indentation were shown in Table 1.

(On-Sand Drop Test)

For the chemically strengthened glasses, the on-sand drop test was performed by the aforementioned test method to measure an average crack height (unit: mm). Results are shown in Table 4.

As for Examples 16, 18, 21, 22, 24, and 25, DOL was 100 μm or more in all Examples and the average crack height in the above on-sand drop test was 300 mm or more in all cases. In Example 26, DOL was 100 μm or less and the average crack height was 129 mm. It is shown that, in the case where DOL is 100 μm or more, the strength can be improved in the resistance in the on-sand drop test and thus it is revealed that an improvement in strength, which is necessary for a cover glass, against fracture resulting from an acute-angle object flawing can be attained.

(Intender Indentation Test)

For a chemically strengthened glass having a size of 25 mm×25 mm×0.8 mm in sheet thickness, by an indenter indentation test under the condition of holding a load ranging from 3 to 10 kgf for 15 seconds with a diamond indenter in which an indenter angle of the facing angle is 60°, the chemically strengthened glass was fractured and the fragmentation number of the glass after fracture was measured. Results thereof are shown in Table 4.

TABLE 4

| | | Ex. 16 | Ex. 17 | Ex. 18 | Ex. 19 | Ex. 20 | Ex. 21 | Ex. 22 | Ex. 23 | Ex. 24 | Ex. 25 | Ex. 26 |
|---|---|---|---|---|---|---|---|---|---|---|---|---|
| Glass composition | | Glass 1 | Glass 1 | Glass 1 | Glass 1 | Glass 1 | Glass 1 | Glass 1 | Glass 1 | Glass 1 | Glass 1 | Glass 5 |
| Sheet thickness mm | | 0.8 | 0.8 | 0.8 | 0.8 | 0.8 | 0.8 | 0.8 | 0.8 | 0.8 | 0.8 | 0.825 |
| First-stage | KNO3 wt % | 95 | 100 | | 100 | 100 | 90 | 96.5 | 95 | 98 | 95 | 100 |
| | NaNO3 wt % | 5 | | 100 | | | 10 | 3.5 | 5 | 2 | 5 | 1 |
| | Temp. | 450 | 450 | 425 | 450 | 450 | 450 | 450 | 450 | 450 | 450 | 450 |
| | time | 7.5 | 6 | 1.5 | 6 | 6 | 1.5 | 6 | 6 | 6 | 6 | 4 |
| Second-stage | KNO3 wt % | — | | 95 | | | — | | | | | |
| | NaNO3 wt % | — | 100 | 5 | 100 | 100 | — | 100 | 100 | 100 | 100 | |
| | Temp. | — | 425 | 450 | 425 | 425 | — | 425 | 425 | 425 | 425 | |
| | time | — | 1.5 | 6 | 4 | 6 | — | 2.5 | 1.5 | 3 | 2 | |
| Abrio | CS@0 | 495 | 575 | 461 | 323 | 323 | 427 | 451 | 625 | 552 | 672 | |
| | CS@10 | 96 | 147 | 141 | 157 | 157 | 179 | 215 | 189 | 148 | 234 | |
| | CS@20 | 53 | 48 | 74 | 135 | 135 | 153 | 122 | 117 | 104 | 140 | |
| | CS@30 | 57 | 37 | 75 | 117 | 117 | 131 | 99 | 100 | 90 | 118 | |
| | CS@40 | 55 | 30 | 73 | 103 | 103 | 109 | 84 | 86 | 74 | 101 | |
| | CS@50 | 50 | 16 | 67 | 85 | 85 | 91 | 71 | 72 | 64 | 87 | |
| | CS@60 | 45 | 8 | 63 | 70 | 70 | 75 | 59 | 63 | 54 | 75 | |
| | CS@70 | 40 | 3 | 57 | 53 | 53 | 60 | 47 | 50 | 41 | 61 | |
| | CS@80 | 35 | −4 | 51 | 46 | 46 | 45 | 39 | 43 | 32 | 51 | |
| | CS@90 | 31 | −12 | 43 | 36 | 36 | 33 | 30 | 37 | 25 | 44 | |
| | CS@100 | 27 | −9 | 40 | 23 | 23 | 21 | 21 | 30 | 18 | 34 | |
| | CS@110 | 25 | −11 | 35 | 17 | 17 | 11 | 14 | 23 | 13 | 26 | |
| | CS@120 | 19 | −17 | 28 | 7 | 7 | 1 | 7 | 18 | 6 | 20 | |
| | CS@130 | 14 | −16 | 22 | 4 | 4 | −8 | 1 | 12 | −3 | 12 | |
| | CS@140 | 11 | −16 | 18 | −13 | −13 | −14 | −4 | 7 | −7 | 7 | |
| | CS@150 | 8 | −16 | 13 | −14 | −14 | −20 | −9 | 2 | −11 | −2 | |
| | CS@160 | 4 | −19 | 7 | −20 | −20 | −26 | −14 | −5 | −14 | −6 | |
| | CS@170 | −3 | −20 | 4 | −23 | −23 | −30 | −18 | −10 | −14 | −12 | |
| | CS@180 | −4 | −21 | −1 | −29 | −29 | −32 | −22 | −13 | −19 | −16 | |
| | CS@190 | −6 | −19 | −8 | −35 | −35 | −36 | −26 | −18 | −21 | −20 | |
| 0.8 t 4PB average (MPa) | | 647 | | | | | 684 | 493 | | | 550 | |
| 0.8 t flaw 4PB average (MPa) | 0.5 kgf | 194 | | | | | 393 | 311 | | | 383 | |
| | 1 kgf | 175 | | | | | 350 | 239 | | | 307 | |
| | 2 kgf | 113 | | | | | 208 | 128 | | | 210 | |
| EPMA | N0 $Na_2O$ wt % @0 μm | 1.72 | 3.40 | 2.69 | 4.57 | 6.63 | 5.05 | 4.71 | 5.13 | 5.36 | | |

TABLE 4-continued

|  | Ex. 16 | Ex. 17 | Ex. 18 | Ex. 19 | Ex. 20 | Ex. 21 | Ex. 22 | Ex. 23 | Ex. 24 | Ex. 25 | Ex. 26 |
|---|---|---|---|---|---|---|---|---|---|---|---|
| NM $Na_2O$ wt %_MAX | 5.28 | 4.25 | 5.86 | 6.16 | 7.26 | 7.54 | 6.15 | 6.98 | 6.47 | | |
| Nh $Na_2O$ wt % @(t/2) pm | 3.07 | 3.06 | 2.96 | 2.97 | 2.92 | 3.08 | 2.96 | 2.93 | 3.08 | | |
| N0/Nh | 0.56 | 1.11 | 0.91 | 1.54 | 2.27 | 1.65 | 1.59 | 1.75 | 1.74 | | |
| NM/Nh | 1.72 | 1.39 | 1.98 | 2.07 | 2.49 | 2.46 | 2.08 | 2.39 | 2.10 | | |
| N0/NM | 0.32 | 0.80 | 0.46 | 0.74 | 0.91 | 0.67 | 0.77 | 0.73 | 0.83 | | |
| K0 $K_2O$ wt % @0 μm | 8.11 | 7.59 | 8.74 | 5.78 | 5.22 | 5.10 | 5.69 | 5.37 | 5.58 | | |
| KM $K_2O$ wt %_MAX | 8.15 | 7.65 | 8.74 | 5.86 | 5.24 | 5.10 | 5.69 | 5.37 | 5.58 | | |
| Kh $K_2O$ wt % @(t/2) μm | 1.55 | 1.50 | 1.50 | 1.51 | 1.59 | 1.51 | 1.51 | 1.56 | 1.52 | | |
| K0/Kh | 5.24 | 5.06 | 5.84 | 3.83 | 3.30 | 3.38 | 3.78 | 3.44 | 3.67 | | |
| KM/Kh | 5.27 | 5.10 | 5.84 | 3.87 | 3.31 | 3.38 | 3.78 | 3.44 | 3.67 | | |
| K0/KM | 1.00 | 0.99 | 1.00 | 0.99 | 1.00 | 1.00 | 1.00 | 1.00 | 1.00 | | |
| Fragmentation number 25 mm square | 2 | 2 | 2 | 2 | 125 | 2 | 2 | 203 | 2 | 322 | 2 |
| On-sand drop Average crack height mm | 456 | | 360 | | | 406 | 497 | | 460 | 509 | 129 |

FIG. 6 shows a graph plotting a relationship between bending strength after flawing under a condition of a load of 0.5 kgf or 1 kgf and $CS_{20}$. FIG. 7 shows a plot of a relationship between bending strength after flawing under a condition of a load of 0.5 kgf or 1 kgf and $CS_{40}$. As mentioned before, in the case where where the bending strength after flawing is 200 MPa or more, the failure rate in the case of the use as a cover glass of a smart phone or a tablet PC can be improved. Also as understood from FIG. 6 and FIG. 7, there is a strong correlation between the compressive stress values ($CS_{20}$ to $CS_{40}$) at a portion of 20 to 40 μm deep from the glass surface and the bending strength after flawing and, as the compressive stress values at a portion of 20 to 40 μm deep from the glass surface increases, a higher bending strength after flawing tends to be obtained. It is revealed that, in the case where $CS_{20}$ or $CS_{40}$ is 60 MPa or more, a bending strength after flawing of 200 MPa or more can be achieved.

FIG. 8 shows a graph plotting a relationship between NM/Nh and $CS_{20}$ or $CS_{40}$. According to this, as NM/Nh increases, $CS_{20}$ and $CS_{40}$ tend to increase. It is revealed that, in the case where NM/Nh is 1.8 or more, $CS_{20}$ and $CS_{40}$ can be controlled to 60 MPa or more, that is, a bending strength after flawing of 200 MPa or more can be achieved.

FIG. 9 shows a graph plotting a relationship between N0/Nh and $CS_{20}$ or $CS_{40}$. According to this, as N0/Nh increases, $CS_{20}$ and $CS_{40}$ tend to increase. It is revealed that, in the case where N0/Nh is 0.8 or more, $CS_{20}$ and $CS_{40}$ can be controlled to 60 MPa or more, that is, a bending strength after flawing of 200 MPa or more can be achieved.

FIG. 10 shows a graph plotting a relationship between N0/NM and $CS_{20}$ or $CS_{40}$. According to this, as N0/NM increases, $CS_{20}$ and $CS_{40}$ tend to increase. It is revealed that, in the case where N0/NM is 0.4 or more, $CS_{20}$ and $CS_{40}$ can be controlled to 60 MPa or more, that is, a bending strength after flawing of 200 MPa or more can be achieved.

The chemically strengthened glasses of Examples 16, 21, and 22 had a KM/Kh of 3 or more and had a bending strength of 400 MPa or more that is required from the viewpoint of securing the cover glass strength.

FIG. 11 shows a graph plotting a relationship between NM−Nh (unit: wt %) and $CS_{20}$ or $CS_{40}$. According to this, as NM−Nh increases, $CS_{20}$ and $CS_{40}$ tend to increase. It is revealed that, in the case where NM−Nh is 2.2 wt % or more, $CS_{20}$ and $CS_{40}$ can be controlled to 60 MPa or more, that is, a bending strength after flawing of 200 MPa or more can be achieved.

FIG. 12 shows a graph plotting a relationship between N0−Nh and $CS_{20}$ or $CS_{40}$. According to this, as N0−Nh increases, $CS_{20}$ and $CS_{40}$ tend to increase. It is revealed that, in the case where N0−Nh is −0.4 wt % or more, $CS_{20}$ and $CS_{40}$ can be controlled to 60 MPa or more, that is, a bending strength after flawing of 200 MPa or more can be achieved.

FIG. 13 shows a graph plotting a relationship between N0−NM and $CS_{20}$ or $CS_{40}$. According to this, as N0−NM increases, $CS_{20}$ and $CS_{40}$ tend to increase. It is revealed that, in the case where N0−NM is −3.5 wt % or more, $CS_{20}$ and $CS_{40}$ can be controlled to 60 MPa or more, that is, a bending strength after flawing of 200 MPa or more can be achieved.

The chemically strengthened glasses of Examples 16, 21, and 22 had a KM−Kh of 3 wt % or more and had a bending strength of 400 MPa or more that is required from the viewpoint of securing the cover glass strength.

While the invention has been described in detail and with reference to specific embodiments thereof, it is apparent to one skilled in the art that various changes and modifications can be made therein without departing from the spirit and scope of the present invention.

The present application is based on Japanese Patent Application (No. 2016-010002) filed on Jan. 21, 2016, Japanese Patent Application (No. 2016-204746) filed on Oct. 18, 2016, and Japanese Patent Application (No. 2016-204747) filed on Oct. 18, 2016 and the whole contents are incorporated herein by reference.

DESCRIPTION OF REFERENCE NUMERALS AND SIGNS

1. Measurement sample
11. Mock plate
12. Sponge double-sided tape
13. Chemically strengthened glass
21. SUS plate
22. Silica sand

The invention claimed is:

1. A chemically strengthened glass having a thickness t of 2 mm or less, having a compressive stress value ($CS_{90}$) at a portion of 90 μm deep from a glass surface being 25 MPa or more, and satisfying a number of fragments generated within a size of 25 mm×25 mm being 20 or less in a fracture test according to an indenter indentation test under a condition of holding a load ranging from 5 kgf to 10 kgf for 15 seconds with a pyramidal diamond indenter having an indenter angle of a facing angle of 60°, wherein the chemically strengthened glass provides a depth of a compressive stress layer (DOL) being 50 μm or more when a glass sheet having a thickness of 1 mm which has a matrix composition of the chemically strengthened glass and has been gradually cooled from a temperature T° C., which is 30° C. to 50° C. higher than a glass transition temperature, to (T−300)° C. at 0.5° C./minute, is subjected to an ion exchange treatment for one hour with a molten salt at 400° C. composed of $KNO_3$, $NaNO_3$, or a mixed salt of $KNO_3$ and $NaNO_3$, and has a matrix composition comprising, in terms of molar percentage on the basis of oxides, from 58 to 72% of $SiO_2$, from 7 to 20% of $Al_2O_3$, from 0 to 5% of $B_2O_3$, from 0 to 3% of $P_2O_5$, from 3 to 20% of $Li_2O$, from 0 to 10% of $Na_2O$, from 0 to 4% of $K_2O$, from 0 to 10% of MgO, from 0.1 to 3% of CaO, from 0 to 3% of SrO, from 0 to 3% of BaO, from 0 to 10% of ZnO, from 0 to 1% of $TiO_2$, and from 0 to 2% of $ZrO_2$.

2. The chemically strengthened glass according to claim 1, satisfying $\Delta CS_{100\text{-}90}$ (unit: MPa/μm) being 0.4 or more, wherein $\Delta CS_{100\text{-}90}$ is calculated according to the following expression using $CS_{90}$ and a compressive stress value ($CS_{100}$) at a portion of 100 μm deep from the glass surface, $$\Delta CS_{100\text{-}90}=(CS_{90}-CS_{100})/(100-90).$$

3. The chemically strengthened glass according to claim 2, wherein $\Delta CS_{100\text{-}90}$ (unit: MPa/μm) is 4.0 or less.

4. The chemically strengthened glass according to claim 1, satisfying $\Delta CS_{DOL\text{-}20}$ (unit: MPa/μm) being 0.4 or more, wherein $\Delta CS_{DOL\text{-}20}$ is calculated according to the following expression using a compressive stress $CS_{DOL\text{-}20}$ at a depth closer to a glass surface side by 20 μm from DOL, $$\Delta CS_{DOL\text{-}20}=CS_{DOL\text{-}20}/20.$$

5. The chemically strengthened glass according to claim 4, wherein $\Delta CS_{DOL\text{-}20}$ (unit: MPa/μm) is 4.0 or less.

6. The chemically strengthened glass according to claim 1, having a fracture stress value σa (bending strength, unit: MPa) being 150 MPa or more obtained by performing a four-point bending test under conditions of an under spun of 30 mm, an upper spun of 10 mm, and a crosshead speed of 0.5 mm/minute after the glass surface is flawed by pressing a diamond indenter (indenter angle of facing angle: 110°) thereto for 15 seconds at a load of 0.5 kgf.

7. The chemically strengthened glass according to claim 1, having a fracture stress value σc (bending strength, unit: MPa) being 150 MPa or more obtained by performing a four-point bending test under conditions of an under spun of 30 mm, an upper spun of 10 mm, and a crosshead speed of 0.5 mm/minute after the glass surface is flawed by pressing a diamond indenter (indenter angle of facing angle: 110°) thereto for 15 seconds at a load of 2 kgf.

8. The chemically strengthened glass according to claim 1, having a surface compressive stress value being 300 MPa or more.

9. The chemically strengthened glass according to claim 1, wherein the depth of a compressive stress layer (DOL) is 100 μm or more.

10. The chemically strengthened glass according to claim 1, wherein the thickness t is 0.9 mm or less.

11. The chemically strengthened glass according to claim 1, having an area Sc (MPa·μm) of a compressive stress layer being 20,000 MPa·μm or more.

12. The chemically strengthened glass according to claim 1, satisfying a value Sc/t (MPa) obtained by dividing an area Sc (MPa·μm) of a compressive stress layer by the thickness t (μm) being 28 MPa or more.

13. The chemically strengthened glass according to claim 1, wherein the depth of a compressive stress layer (DOL) is 115.1 μm or more and 173.2 μm or less.

14. The chemically strengthened glass according to claim 1, having a compressive stress value ($CS_{90}$) at a portion of 90 μm deep from a glass surface being 25 MPa or more and 60.2 MPa or less.

15. The chemically strengthened glass according to claim 1, satisfying a number of fragments generated within a size of 25 mm×25 mm being 12 or less and 2 or more in a fracture test according to an indenter indentation test under a condition of holding a load ranging from 5 kgf to 10 kgf for 15 seconds with a pyramidal diamond indenter having an indenter angle of a facing angle of 60°.

16. The chemically strengthened glass according to claim 1, satisfying an average crack height (unit: mm) being 300 mm or more in an on-sand drop test carried out 5 to 10 times, wherein, each time, a sample of the chemically strengthened glass (50 mm×50 mm×0.8 mm in thickness) attached to a hard Nylon-made mock plate (50 mm×50 mm×18 mm in thickness, weight: 54 g) by a sponge double-sided tape (50 mm×50 mm×3 mm in thickness) is dropped, chemically strengthened glass facing downward, from a predetermined height (drop height) onto a SUS plate (15 cm×15 cm) on which 1 g of silica sand is scattered, wherein the drop height is initially 10 mm and is increased by 10 mm until a height at which the sample is cracked (crack height) is determined.

17. The chemically strengthened glass according to claim 1, satisfying an average crack height (unit: mm) being 313 mm or more and 509 mm or less in an on-sand drop test carried out 5 to 10 times, wherein, each time, a sample of the chemically strengthened glass (50 mm×50 mm×0.8 mm in thickness) attached to a hard Nylon-made mock plate (50 mm×50 mm×18 mm in thickness, weight: 54 g) by a sponge double-sided tape (50 mm×50 mm×3 mm in thickness) is dropped, chemically strengthened glass facing downward, from a predetermined height (drop height) onto a SUS plate (15 cm×15 cm) on which 1 g of silica sand is scattered, wherein the drop height is initially 10 mm and is increased by 10 mm until a height at which the sample is cracked (crack height) is determined.

18. The chemically strengthened glass according to claim 1, which satisfies N0/Nh being 1.8 or more, wherein N0 is a value obtained by converting a value on an outermost surface in an Na ion concentration profile in a sheet thickness direction of the chemically strengthened glass measured by Electron Probe Micro Analyzer (EPMA) to $Na_2O$ (% by weight), and Nh is a value obtained by converting a central value of sheet thickness in an Na ion concentration profile in a sheet thickness direction of the chemically strengthened glass measured by EPMA to $Na_2O$ (% by weight).

19. The chemically strengthened glass according to claim 1, which satisfies $\Delta CS_{30-0}$ (unit: MPa/μm) being 20 or less, wherein $\Delta CS_{30-0}$ is calculated according to the following expression using a surface compressive stress (CS) and a compressive stress value ($CS_{30}$) at a portion of 30 μm deep from the glass surface, $$\Delta CS_{30-0} = (CS - CS_{30})/(30-0).$$

20. A method for manufacturing the chemically strengthened glass according to claim 1, comprising performing at least two stages of ion exchange treatments on the glass, wherein $KNO_3$ concentration in a molten salt to be used in a first-stage ion exchange treatment is 60% by weight or more and $NaNO_3$ concentration in a molten salt to be used in a second-stage ion exchange treatment is 5% by weight or more.

* * * * *